United States Patent
Hotta

(10) Patent No.: US 9,720,751 B2
(45) Date of Patent: Aug. 1, 2017

(54) ANALYSIS METHOD, ANALYSIS APPARATUS AND COMPUTER-READABLE RECORDING MEDIUM HAVING STORED THEREIN ANALYSIS PROGRAM

(71) Applicant: FUJITSU LIMITED, Kawasaki-shi, Kanagawa (JP)

(72) Inventor: Yuuji Hotta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 111 days.

(21) Appl. No.: 14/668,141

(22) Filed: Mar. 25, 2015

(65) Prior Publication Data
US 2015/0301866 A1 Oct. 22, 2015

(30) Foreign Application Priority Data
Apr. 18, 2014 (JP) .................................. 2014-086154

(51) Int. Cl.
G06F 11/34 (2006.01)
G06F 11/00 (2006.01)
H04L 12/24 (2006.01)

(52) U.S. Cl.
CPC .......... *G06F 11/00* (2013.01); *G06F 11/3466* (2013.01); *G06F 11/3476* (2013.01); *H04L 41/5009* (2013.01)

(58) Field of Classification Search
CPC ............. G06F 11/3466; G06F 11/3476; G06F 11/0766
See application file for complete search history.

(56) References Cited

U.S. PATENT DOCUMENTS

| | | | |
|---|---|---|---|
| 2007/0226718 A1 | 9/2007 | Watanabe | |
| 2008/0092121 A1* | 4/2008 | DeRose | G06F 11/3409 717/125 |
| 2008/0168044 A1* | 7/2008 | Barron | G06F 11/3419 |
| 2010/0095162 A1 | 4/2010 | Inakoshi | |
| 2010/0138833 A1* | 6/2010 | Franklin | G06F 11/3676 718/100 |
| 2011/0264787 A1* | 10/2011 | Mickens | G06F 11/3414 709/224 |

(Continued)

FOREIGN PATENT DOCUMENTS

| | | |
|---|---|---|
| JP | 2007-264734 | 10/2007 |
| JP | 2013-97783 | 5/2013 |
| WO | 2008/129635 | 10/2008 |

*Primary Examiner* — Yolanda L Wilson
(74) *Attorney, Agent, or Firm* — Fujitsu Patent Center

(57) ABSTRACT

Relating to services each including a plurality of processes having a plurality of hierarchies, service information is stored in which processes for each service are grouped in a predetermined hierarchy taking presence or absence of a common hierarchy into consideration. Then, based on log data and the service information relating to a plurality of services, a first decision process for deciding presence or absence of an abnormality relating to a process included in one or more services is performed. Further, a second decision process is performed for developing, where a process decided as an abnormal process is a grouped grouping process, the grouping process decided as an abnormal process to one or more processes in a lower hierarchy than the predetermined hierarchy based on the service information and deciding presence or absence of an abnormality relating to the one or more developed processes.

20 Claims, 26 Drawing Sheets

(56) References Cited

U.S. PATENT DOCUMENTS

2013/0116976 A1    5/2013  Kanemasa et al.
2014/0164840 A1*   6/2014  Luo .................. H04M 1/27455
                                                              714/37

* cited by examiner

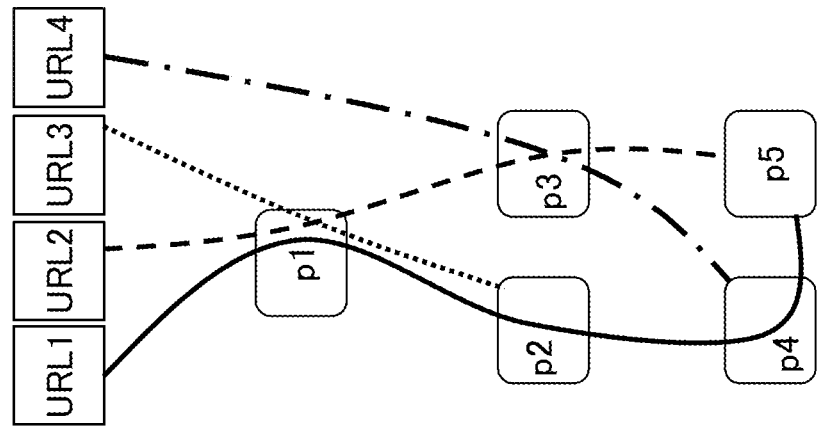

FIG. 3A

|    | F1 | F2 | F3 | F4 |
|----|----|----|----|----|
| p1 | 1  | 1  | 1  |    |
| p2 | 1  |    | 1  |    |
| p3 |    | 1  |    | 1  |
| p4 | 1  |    |    | 1  |
| p5 | 1  | 1  |    |    |

FIG. 3B

|    | F1 | F2 | F3 | F4 | OR (B) |
|----|----|----|----|----|--------|
| p1 | 1  | 1  |    |    | 1      |
| p2 | 1  |    | 1  |    | 1      |
| p3 |    | 1  | 1  |    | 1      |
| p4 | 1  |    |    | 1  | 1      |
| p5 | 1  | 1  |    |    | 1      |

FIG. 3C

|    | F1 | F2 | F3 | F4 | OR (B) | OR (C) |
|----|----|----|----|----|--------|--------|
| p1 | 1  |    | 1  |    | 1      | 1      |
| p2 | 1  |    | 1  |    | 1      | 1      |
| p3 |    | 1  |    | 1  | 1      | 1      |
| p4 | 1  |    |    | 1  | 1      | 1      |
| p5 | 1  | 1  |    |    | 1      | 0      |

FIG. 3D

|    | F1 | F2 | F3 | F4 | OR (B) | OR (C) | XOR (D) |
|----|----|----|----|----|--------|--------|---------|
| p1 | 1  |    |    |    | 1      | 1      | 0       |
| p2 | 1  |    | 1  |    | 1      | 1      | 0       |
| p3 |    | 1  | 1  | 1  | 1      | 1      | 0       |
| p4 | 1  |    |    | 1  | 1      | 1      | 0       |
| p5 | 1  | 1  |    |    | 1      | 0      | 1       |

FIG. 5

EXAMPLE OF
DETAILED LOG                                    121

| TIME | tid | VALUE |
| --- | --- | --- |
| timestamp1, | tid1, | com.lang.Java.Foo1#Meth1 |
| timestamp3, | tid1, | javax.foo.Pkg1#Meth2 |
| ... | | |
| timestamp5, | tid1, | com.lang.Java.Foo1#Meth3 |
| ... | | |

FIG. 6

EXAMPLE OF
COUPLING RESULT                     122

URL , tid , VALUE
URL1, tid1, jpn. user. Pkg1#Meth1
URL1, tid1, javax. foo. Pkg1#Meth2
URL1, tid1, com. lang. Java. Foo1#Meth1
URL1, tid1, com. lang. Java. Foo1#Meth2
URL1, tid1, com. lang. Java. Foo1#Meth3
...
URL2, tid2, com. lang. Java. Foo1#Meth1
...

FIG. 7

```
       EXAMPLE OF cid              123
    CORRESPONDENCE TABLE
   ┌─────────────────────────────────────┐
   │ cid:VALUE                           │
   │─────────────────────────────────────│
   │ c1  : jpn. user. Pkg1#Meth1         │
   │ c2  : javax. foo. Pkg1#Meth2        │
   │ c3  : com. lang. Java. Foo1#Meth1   │
   │ c4  : com. lang. Java. Foo1#Meth2   │
   │ c5  : com. lang. Java. Foo1#Meth3   │
   └─────────────────────────────────────┘
```

FIG. 8

| EXAMPLE OF cid SET TABLE | 124 |

```
URL  :tid  :cid SET
URL1:tid1:c1, c2, c3, c4, c5
URL2:tid2:c1, c2, c3, c5
```

FIG. 11

| EXAMPLE OF COMPONENT DEFINITION INFORMATION | 127 |

```
pid  : VALUE
p1   : jpn. user. Pkg1#Meth1
p2   : javax. foo. Pkg1#Meth2
p3. a: p3. 1, p3. 2, p3. 3
p3. b: p3. 1, p3. 3
p3. 1: com. lang. Java. Foo1#Meth1
p3. 2: com. lang. Java. Foo1#Meth2
p3. 3: com. lang. Java. Foo1#Meth3
```

FIG. 13

```
EXAMPLE OF
ACCESS LOG                                           221
┌─────────────────────────────────────────────┐
│ URL                    , TIME     , RESPONSE│
│ http://foo.com/a.cgi?~, timestamp1, 3ms     │
│ http://foo.com/b.cgi?~, timestamp2, 150ms   │
└─────────────────────────────────────────────┘
```

FIG. 19
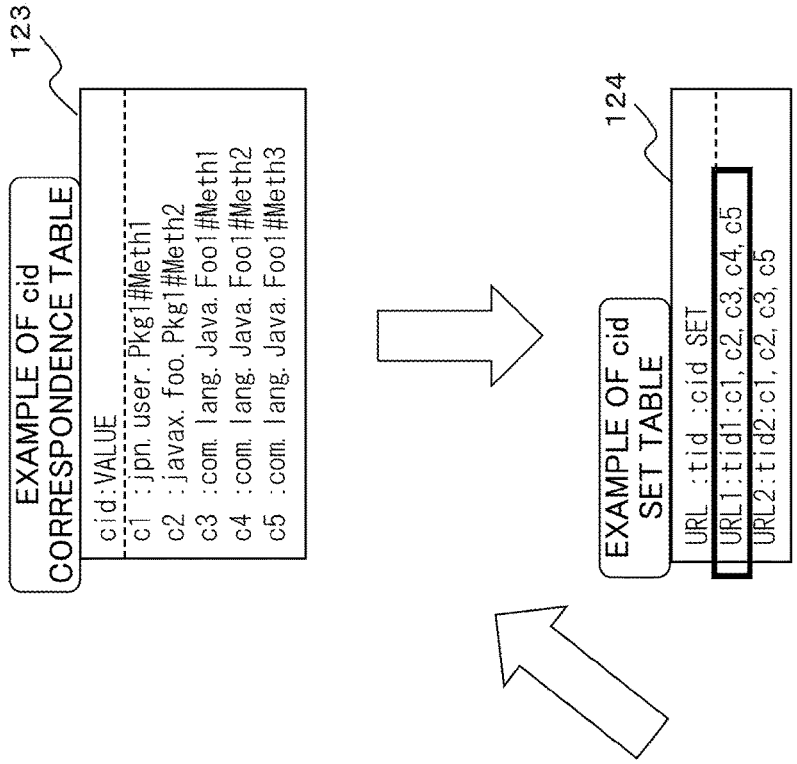
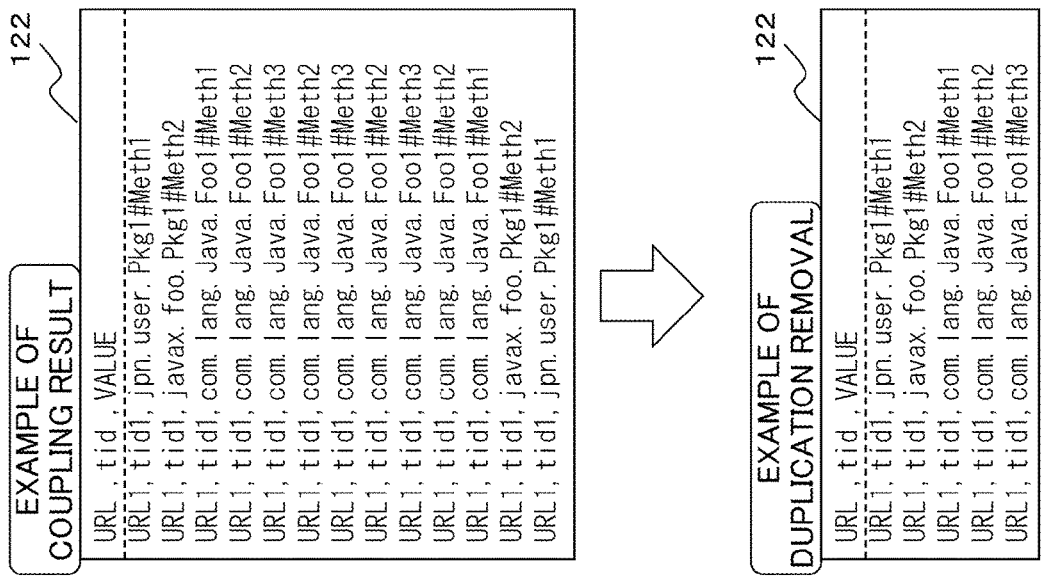

ANALYSIS METHOD, ANALYSIS APPARATUS AND COMPUTER-READABLE RECORDING MEDIUM HAVING STORED THEREIN ANALYSIS PROGRAM

CROSS-REFERENCE TO RELATED APPLICATION

This application is based upon and claims the benefit of priority of the prior Japanese Patent Application No. 2014-086154, filed on Apr. 18, 2014, the entire contents of which are incorporated herein by reference.

FIELD

The present invention relates to an analysis method, an analysis apparatus and a computer-readable recording medium having stored therein an analysis program.

BACKGROUND

It is attempted to specify, in a plurality of services including a plurality of predetermined processes, for example, in an application program or a network service, a process in which an abnormality such as delay occurs. For example, a method is available by which, when delay of a service (response) occurs, a log outputted from each process is analyzed to detect an abnormal (problem) point (portion) and ascertains the cause under an actually operating situation.

It is to be noted that the abnormal point signifies a point (process, component) in a Web request or the like at which an abnormality such as delay occurs in an apparatus that configures a system or a network. For example, as an abnormal point, a delay interval of a network, a DB or a cable having a delay cause of a Relational Database (RDB), a method of a delay cause of an application or the like from within a network configuring a system, an RDB, an application or the like are listed.

As an example, an abnormal point of a service can be found out by sampling logs before and after each process of a service and continuously monitoring a state by a monitoring process. For example, in the case of a processing sequence of start-A-B-C-D-end, by sampling logs to which timestamps just before A, intermediate between A and B, intermediate between B and C, intermediate between C and D and just before D are applied, delay in the processes of A to D can be found out. For example, when the process B suffers from delay, the process B can be specified as an abnormal point (abnormal process) by referring to the log just before B (between A and B) and the log just after B (between B and C).

[Patent Document 1] Japanese Laid-Open Patent Publication No. 2007-264734

[Patent Document 2] International Publication Pamphlet No. WO 2008/129635

[Patent Document 3] Japanese Laid-Open Patent Publication No. 2013-097783

It seems a recommendable idea to configure an analysis apparatus that performs analysis and detection of an abnormal point such that the analysis apparatus stores processes (components) to be executed by individual services in advance and detects a process having a high degree of possibility that it may have an influence on delay from among a plurality of services executed when delay occurs.

However, in order to detect an abnormal point in each service, the monitoring apparatus samples a great amount of logs at a great number of monitoring points. Therefore, a great amount of execution overheads and network loads are generated upon filtering and specification of an abnormal point. In this manner, since sampling and analysis of logs outputted from individual processes involves increase of the load in a network and so forth, increased time is used for detection as the number of processes included in a service increases and an influence is sometimes had on service provision of the system.

Further, it seems recommendable to configure the monitoring apparatus such that the man-hour for detection is decreased by integrating processes executed by services in a predetermined unit. However, depending upon the unit for integrating the processes, there is the possibility that a process to be found as an abnormal process may be hidden and an abnormal point may be difficult to detect.

SUMMARY

According to an aspect of embodiments, an analysis method includes, storing, relating to services each including a plurality of processes having a plurality of hierarchies, service information in which processes for each service are grouped in a predetermined hierarchy taking presence or absence of a common hierarchy into consideration; performing, based on log data and the service information relating to a plurality of services, a first decision process for deciding presence or absence of an abnormality relating to a process included in one or more services; and performing a second decision process for developing, where a process decided as an abnormal process is a grouped grouping process, the grouping process decided as an abnormal process to one or more processes in a lower hierarchy than the predetermined hierarchy based on the service information and deciding presence or absence of an abnormality relating to the one or more developed processes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a view depicting an example of a correspondence relationship (path information) between serviced (paths) and components;

FIGS. 3A to 3D are views depicting examples in which a relationship between functions and components according to the present embodiment is represented by a matrix;

FIG. 5 is a view depicting an example of a detailed log according to the present embodiment;

FIG. 6 is a view depicting an example of a coupling result according to the present embodiment;

FIG. 7 is a view depicting an example of a cid correspondence table according to the present embodiment;

FIG. 8 is a view depicting an example of a cid set table according to the present embodiment;

FIG. 11 is a view depicting an example of component definition information according to the present embodiment;

FIG. 13 is a view depicting an example of an access log according to the present embodiment;

FIG. 19 is a view particularly illustrating the component extraction process according to the present embodiment;

DESCRIPTION OF EMBODIMENTS

Figure 1:
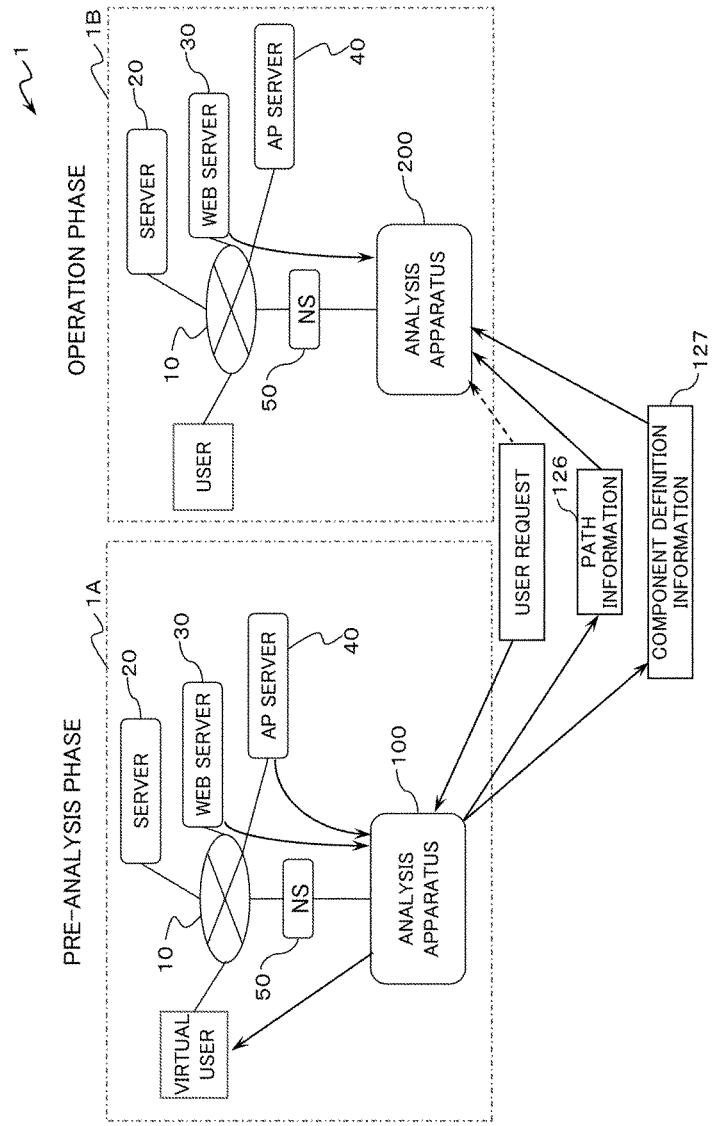
FIG. 1 is a block diagram depicting an example of a network system according to an embodiment.

In the following, an embodiment of the present invention is described with reference to the drawings. It is to be noted that the present embodiment described below is illustrative to the end, and there is no intention to eliminate various modifications and applications of the technique not specified in the present embodiment described below. In other words, variations and modifications can be made without departing from the scope of the present invention. It is to be noted that, unless otherwise specified, like elements to which like reference characters are applied are denoted by same or like reference characters in the drawings used in the present embodiment described below.

[1] Configuration of the Embodiment

A configuration of the present embodiment is described with reference to FIGS. 1 to 16.

[1-1] Configuration of the Network System According to the Embodiment

FIG. 1 is a block diagram depicting an example of a network system 1 according to the present embodiment. The network system 1 depicted in FIG. 1 exemplarily includes a network 10 such as the Internet, a server group 20, 30 and 40 coupled with the network 10, a network switch 50, analysis apparatus 100 and 200 and so forth. The server group 20, 30 and 40 exemplarily includes a Web server 30, an application (AP) server 40, a different server 20 and so forth. It is to be noted that, as the server group 20, 30 and 40, an information processing apparatus such as a Personal Computer (PC) or a server is available.

For example, the AP server 40 can include a processor such as a Central Processing Unit (CPU), a memory such as a Read Only Memory (ROM) or a Random Access Memory (RAM), a storage apparatus such as a Hard Disk Drive (HDD) or a Solid State Drive (SSD), a display apparatus such as a Liquid Crystal Display (LCD) unit, a printing apparatus and so forth. In the AP server 40, various functions are implemented by the CPU reading out and executing a predetermined application program from a memory or a storage apparatus. For example, a result of arithmetic operation by the CPU or the like can be outputted to the display apparatus or the printing apparatus. It is to be noted that, also in the different server 20 or the Web server 30, a CPU, a memory, a storage apparatus, a display apparatus and a printing apparatus similar to those included in the AP server 40 may be provided.

Incidentally, as depicted in FIG. 1, the network system 1 includes the analysis apparatus 100 in a pre-analysis phase 1A but includes the analysis apparatus 200 in an operation phase 1B.

The analysis apparatus 100 produces service information hereinafter described in the pre-analysis phase 1A. Further, the analysis apparatus 200 specifies, in the operation phase 1B, an abnormal point based on the service information produced in advance by the analysis apparatus 100. In particular, the analysis apparatus 100 produces service information before analysis is performed by the analysis apparatus 200 under a condition similar to that of the configuration of the operation phase 1B. It is to be noted that, in the present embodiment, an abnormal point signifies a point (process, component) at which an abnormality such as delay occurs, for example, in an apparatus configuring a system, a network or the like.

In this manner, it is preferable that the pre-analysis phase 1A includes the configuration similar to the configuration of the network 10, server group 20, 30 and 40, network switch 50 and so forth to be used in the operation phase 1B. In other words, the configuration of the pre-analysis phase 1A does not have to be common to (completely same as) the configuration of the operation phase 1B. For example, a configuration including hardware different from that in the operation phase 1B such as a staging environment of the operation phase 1B or the like may be applied. Or, at least one of the pre-analysis phase 1A and the operation phase 1B may be configured as a Virtual Machine (VM).

It is to be noted that the functions as the analysis apparatus 100 and 200 can be implemented by the AP server 40 and so forth, or may be implemented by an information processing apparatus such as a different PC or a different server included in the network system 1. Further, the functions as the analysis apparatus 100 and 200 may be implemented by one AP server 40 or one information processing apparatus.

Operation of the analysis apparatus 100 and 200 according to the present embodiment is described briefly.

First, in order to specify an abnormal point without generation of a surplus overhead or a network load upon operation in the analysis apparatus 200, the analysis apparatus 100 samples and analyzes detailed logs in advance and produces service information for each service. At this time, the analysis apparatus 100 classifies a path of each service of the system using data sampled by reproducing (replaying) actual data or test data captured in advance.

For example, where p1 to p5 are used as network components as depicted in FIG. 2, the analysis apparatus 100 analyzes message data (logs) flowing through the components p1 to p5. Then, the analysis apparatus 100 classifies paths, for example, on the basis of a Uniform Resource Locator (URL) indicating a resource on the network+Common Gateway Interface (CGI) parameter.

Consequently, it can be recognized that each of the services (URLi (i indicates a natural number)) passes as described below.

URL1=p1-p2-p4-p5
URL2=p1-p3-p5
URL3=p1-p2
URL4=p3-p4

It is to be noted that a component pj (j is a natural number) is a unit when the analysis apparatus 100 and 200 perform analysis. "component" is hereinafter referred to sometimes as "process". Further, "service" is hereinafter referred to sometimes as "function" or "URL". It is to be noted that "path" is determined as a set of "components". Here, URLi is a combination of components called by the user, namely, an identifier for specifying a service, and there is no intention to limit the URLi to an identifier for specifying a resource in the general Internet.

By the classification scheme described above, the analysis apparatus 100 can produce path information and component definition information as an example of the service information. It is to be noted that the path information is information indicating a corresponding relationship between the URLi and the plurality of components pj, namely, information indicating a combination of the components pj included in the service URLi (information for specifying the component pj to be used). Further, the component definition information is detailed information of the component pj, for example, a call name (calling name) of a component and/or detailed information of a component where components are integrated.

Here, if the URL1 and the URL2 suffer from delay in comparison with those in a normal state, the analysis apparatus 200 can estimate a component through which the URL1 and URL2 pass by referring to the service information analyzed in such a manner as described above by the analysis apparatus 100. In the example of FIG. 2, the analysis apparatus 200 can determine that there is the possibility that all components p1, p2, p3, p4 and p5 may be abnormal points.

Further, for example, on the basis of information indicating that the URL3 and URL3 do not suffer from delay and path information of the URL3 and URL4, the analysis apparatus 200 can determine that there is no problem in the components p1, p2, p3 and p4 that are common paths to the URL1, URL2 and URL3. As a result, the analysis apparatus 200 can diagnose that the remaining component p5 is a cause of the delay.

It is to be noted that, where an analysis target is a program, the component pj can be processed taking, as a unit, a method (function) call, a block, a log outputting point designated by a utilizer, or a combination of suitable ones of the units as exemplarily described below.

Method (Function) Call
p1=method1( )→p2=method2( )→p4=method3( ) or the like

Block (Block Delimited by an "if" Sentence, or "{ }", or the Like)
p1=while ( . . . )→p2= if( ) . . . →p4=else . . . or the like Log Outputting Point Designated by a Utilizer
p1={file=foo.java, line=35}→p2={file=foo.java, line=55}→p4={file=boo.java,line=20} or the like It is to be noted that the component pj may be processed taking, as a unit, an ID such as a uid (user ID) or the like as an element of a general URL, or may be processed taking, as a unit, an apparatus and/or network such as a server group 20, 30 and 40, a network apparatus or a network between apparatuses.

As a simple example, the path information can be represented by a matrix of the URL1 to URL3 (services) and the components p1 to p5 as depicted in FIG. 3A.

As exemplarily depicted in FIG. 3B, the analysis apparatus 200 detects a component of a degraded service (URL1 and URL2 in the example of FIG. 2) by logical sum (OR). Further, as exemplarily depicted in FIG. 3C, the analysis apparatus 200 detects a component of a service (URL3 and URL3 in the example of FIG. 2) that is not degraded by OR.

Further, as exemplarily depicted in FIG. 3D, the analysis apparatus 200 performs exclusive logical sum (XOR) on the basis of the result of FIG. 3B and the result of FIG. 3C. Then, the analysis apparatus 200 performs logical product (AND) on the basis of the result of FIG. 3B and the result of FIG. 3D. In the present embodiment, a result of the AND is same as that of FIG. 3D. As exemplarily depicted in FIG. 3D, it can be specified in accordance with the result of the AND that the component p5 in which "1" remains is a problem point.

[1-2] Comparative Example

Here, a comparative example of the analysis apparatus 100 and 200 according to the present embodiment is described.

It seems recommendable to estimate, in order to find out an abnormal point in a service such as an application program or a network component, a cause component using path information or component definition information prepared in advance and operation information obtained upon operation.

For example, it seems possible to define a granularity of a component by a technique of a (technique 1) or a (technique 2) described below by analysis performed in advance and then define a component. It is to be noted that the granularity is a size of a grain of a component and is a unit of processing of with what degree of details a component is to be filtered and a notification of a result is to be issued. If the unit of processing is excessively rough, then cutout of a process becomes insufficient, but, if the unit of processing is excessively fine, then time and a great amount of resources are used for an analysis process.

(Technique 1) Technique for Determining the Level Uniformly and then Performing Componentization A case is considered in which, as a module (process) of the finest granularity included in a service called by the user, four examples described below are available. It is to be noted that the rows described below are call names of modules (processes). Further, for example, in the first row, "com.lang. Java.", "Foo1" and "#Meth1" indicate package, class, and method, respectively. Each of the modules of the rows is, for example, a method (function) call described above and is a process to be executed by an application such as the AP server 40.

com.lang.Java.Foo1#Meth1
com.lang.Java.Foo2#Meth2
com.user.Pkg#Meth1
com.user.Pkg#Meth2

Where the classes and methods given above exist, for example, if a component is automatically defined with level=3, in other words, if three elements from among the uppermost elements (for example, "com" at the left end) are integrated into an integrated component, then:

p1=com.lang.Java
p2=com.user.Pkg

Further, if a component is automatically defined with level=4, then:

p1=com.lang.Java.Foo1
p2=com.lang.Java.Foo2
p3=com.user.Pkg#Meth1
p4=com.user.Pkg#Meth2

(Technique 2) Technique for Determining a Number of Elements and Performing Componentization A case is considered in which a plurality of modules described below are available as modules included in a service called by the user. It is to be noted that, in an example described below, methods "#Meth2" to "#Meth22" of package and class "com.lang.Java.Foo1" are omitted and represented by " . . . "

cam.lang.Java.Foo1#Meth1
. . .
com.lang.Java.Foo1#Meth23
com.lang.Java.Foo2#Meth1
com.lang.Java.Foo2#Meth2
cam.user.Pkg#Meth1
cam.user.Pkg#Meth2
com.user.Pkg#Meth3

Where the classes and methods described above are available, if a component is automatically defined by a number of elements at a terminal unit >3, in other words, if elements are integrated as a component in the case in which the number of elements >3, then:

p1=com.lang.Java.Foo1 ("#Meth1" to "#Meth23" are integrated)
p2=com.lang.Java.Foo2#Meth1
p3=com.lang.Java.Foo2#Meth2
p4=com.user.Pkg#Meth1
p5=com.user.Pkg#Meth2
p6=com.user.Pkg#Meth3

Further, for example, if a component is automatically defined by a number of elements at a terminal unit >2, then:

p1=com.lang.Java.Foo1 ("#Meth1" to "#Meth23" are integrated)
p2=com.lang.Java.Foo2#Meth1
p3=com.lang.Java.Foo2#Meth2
p4=com.user.Pkg ("#Meth1" to "#Meth3" are integrated)

In this manner, by the technique of the (technique 1) or the (technique 2) described above, the analysis apparatus can vary the level or the number of elements as a threshold value to adjust the granularity for defining a component. Then, the analysis apparatus can estimate a component at an abnormal point using the path information and the component definition information defined as described above as well as the operation information (for example, log data) obtained upon operation.

However, it is difficult to determine an appropriate granularity in the technique of the (technique 1) or the (technique 2) described above.

For example, where a rough granularity is set to a component (where the level or the number of elements to be used as the threshold value in the technique of the (technique 1) or the (technique 2) described above is small), the analysis apparatus sometimes makes a mistake in filtering of analysis in the operation phase.

Exemplarily, it is assumed that components in services described below are defined by component definitions.

URL1=p1-p2-p3 (p31-p32-p33)
URL2=p1-p3 (p31-p33)

It is to be noted that, in the example described above, the component p3 in the URL1 is obtained by integrating the components p31, p32 and p33 in the parentheses at the tail end by the technique of the (technique 1) or the (technique 2) described above. Similarly, the component p3 in the URL2 is obtained by integrating the components p31 and p33 in the parentheses at the tail end. In other words, the elements in the parentheses indicate path information in the case of a finer granularity. Such a hierarchical component as just described is indicated by adding the parentheses at the tail end of the component in a higher hierarchy and representing components in a lower hierarchy in the parentheses.

Here, where the component of p32 is a delay cause, the URL1 including p32 suffers from delay in such a manner as described below while the URL2 which does not include p32 does not suffer from delay.

x URL1=p1-p2-p3
o URL2=p1-p3

If this is analyzed by the analysis apparatus, then the component p2 included only in the delayed path is extracted as an abnormal point. While p32 actually is a delay cause, since the p31 to p33 are integrated as p3 (irrespective of presence or absence of p32) by the technique of the (technique 1) or the (technique 2) described above, such an erroneous result of the analysis as just described is obtained.

Further, if, in the example described above, service information of o URL3=p1-p2 is included, then the URL 3 is a path including p2 but does not suffer from delay. Therefore, it is decided by the analysis apparatus that p2 is not an abnormal point, and nothing is extracted as an abnormal point.

On the other hand, for example, if a finer granularity is set to the component (if the level or the number of elements to be used as the threshold value in the technique of the (technique 1) or the (technique 2) is higher), then the load of the process to the analysis apparatus increases in the operation phase. In other words, in order to avoid erroneous detection of an abnormal point in such a process with a rough granularity as described above, it seems possible for the analysis apparatus to produce service information in which a finer granularity is set to all of p1, p2 and p3 and so forth and then perform analysis.

However, since the analysis with a fine granularity consumes a great memory amount and time is used for the analysis, this analysis is not suitable for analysis on the real time basis during operation. Further, it is difficult to decide to what degree the granularity is made finer as a finer granularity, in other words, to what value the level or the number of elements to be used as the threshold value is to be set.

Exemplarily, where the number of URLs is ten as described below and each of the URLs has a rough granularity passing ten components:

URL1=p1-p2-p3-p4-p5-p6-p7-p8-p9-p10
URL2=p2-p3-p4-p5-p6-p7-p8-p9-p10-p11
URL10= . . .

The number of arithmetic operations upon analysis by the analysis apparatus is:

10 URLs×10 components=100

If a finer granularity is applied and each component is developed to 100 components as given by:

p1=p1.1-p1.2-p1.3 . . . -p1.100
p2=p2.1-p2.2 . . . -p2.100 then, the URLs are represented as given by:

URL1=p1.1-P1.2 . . . -p1.100-p2.1-p2.2 . . . -p2.100 . . . -p10.100
URL2= . . .

In this case, the number of arithmetic operations upon analysis by the analysis apparatus is given by:

10 URLs×100 components=1000

In this manner, it is difficult to define an optimum granularity by the analysis technique using the (technique 1) or the (2), and an erroneous result of the analysis is sometimes obtained if the analysis is performed with a granularity that is not an optimum granularity.

[1-3] Configuration of the Analysis Apparatus According to the Present Embodiment In contrast, the analysis apparatus 100 and 200 according to the present embodiment can detect an abnormal module (may also be referred to a delayed component or an abnormal process) through a small number of decision processes by executing a process hereinafter described in the pre-analysis phase 1A and the operation phase 1B.

A configuration of the analysis apparatus 100 and 200 according to the present embodiment is described with reference to FIGS. 4 to 16.

[1-3-1] Configuration of the Analysis Apparatus in the Pre-Analysis Phase

Figure 4:
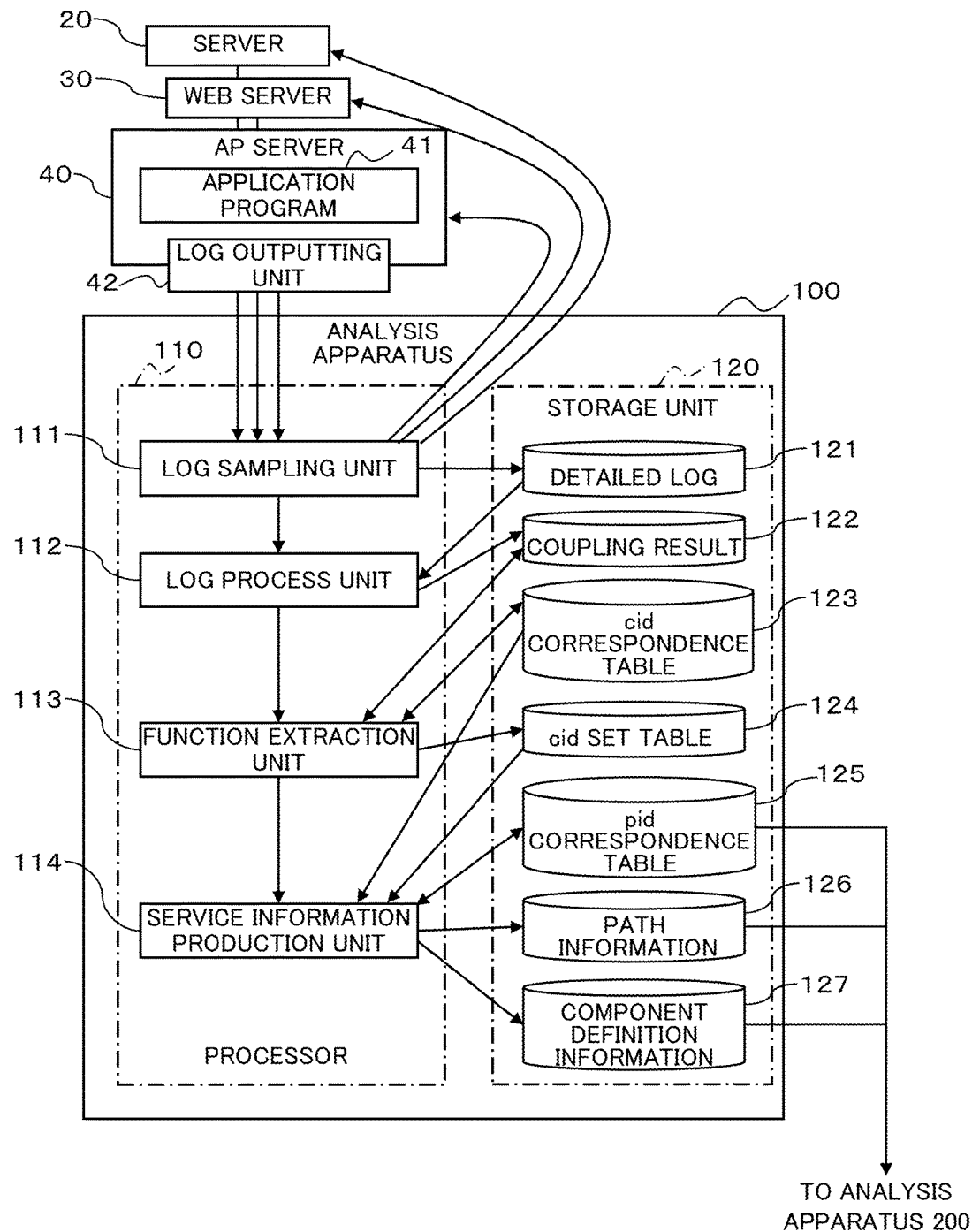
FIG. 4 is a block diagram depicting a hardware configuration and a functional configuration of an analysis apparatus in a pre-analysis phase of the present embodiment.

First, a configuration of the analysis apparatus 100 in the pre-analysis phase 1A is described with reference to FIG. 4. FIG. 4 is a block diagram depicting a hardware configuration and a functional configuration of the analysis apparatus 100 in the pre-analysis phase 1A of the present embodiment. As described hereinabove, the analysis apparatus 100 can be provided in the AP server 40 or the like or an information processing apparatus separate from the server group 20, 30 and 40. In the present embodiment, the analysis apparatus 100 is provided in an information processing apparatus separate from the server group 20, 30 and 40.

Exemplarily, the analysis apparatus 100 includes a processor 110 such as a CPU, a Micro-Processing Unit (MPU) or a computer, and a storage unit 120 such as a RAM and/or an HDD.

Exemplarily, the processor 110 includes a log sampling unit 111, a log process unit 112, a function extraction unit 113 and a service information production unit 114. The processor 110 can read out and execute a predetermined application program (analysis program) from the storage unit 120 so that functions of the components are implemented. Further, the storage unit 120 can store the analysis program just described therein and can store various kinds of information to be used for a pre-analysis process by the processor 110 therein. The storage unit 120 can store, as the various kinds of information, for example, a detailed log 121, a coupling result 122, a cid correspondence table 123, a cid set table 124, a pid correspondence table 125, path information 126 and component definition information 127.

The analysis program described above may be provided in the form in which it is recorded on a computer-readable recording medium. In this case, the processor 110 can read out the program from the recording medium through an interface such as a readout apparatus and transfer and store the read out program to and into an internal storage apparatus or an external storage apparatus so that the program is executed.

It is to be noted that, as a (e.g., non-transitory) recording medium, for example, an optical disk such as a flexible disk, a Compact Disk (CD), a Digital Versatile Disk (DVD) or a Blu-ray disk, a Universal Serial Bus (USB) memory and a flash memory such as an SD card are available. As a CD, a CD-ROM, a CD-Recordable (CD-R), a CD-Rewritable (CD-RW) and so forth are available. Further, as a DVD, a DVD-ROM, a DVD-RAM, a DVD-R, a DVD-RW, a DVD+R, a DVD+RW and so forth are available.

Now, functions as the log sampling unit 111, log process unit 112, function extraction unit 113 and service information production unit 114 that are implemented by the processor 110 are described with reference to FIGS. 5 to 11.

The log sampling unit 111 sends (issues) data (a request or the like) of a user request as data of a virtual user to the network 10 (not depicted in FIG. 4). It is to be noted that the request issued from the log sampling unit 111 may be a request based on a test scenario prepared in advance. Or, the log sampling unit 111 may store an actual request and state in the operation phase 1B by packet capture or the like so that an operation state upon actual operation is reproduced.

In the AP server 40 that receives the request through the network 10, a process is executed in response to the request by the application 41 and a request log corresponding to the request is outputted from the log outputting unit 42 to the analysis apparatus 100. It is to be noted that, in the pre-analysis phase 1A, a request log is outputted from the log outputting unit 42 to the analysis apparatus 100 also from the different server 20 and the Web server 30 similarly as in the process just described.

The log sampling unit 111 samples a detailed log 121 exemplified in FIG. 5 from the log outputting unit 42 of the AP server 40 or the like and stores the sampled log into the storage unit 120.

FIG. 5 is a view depicting an example of the detailed log 121 according to the present embodiment. The detailed log 121 is an example of a log (e.g., request log) to be outputted from the log outputting unit 42. Exemplarily, in the detailed log 121, time (for example, "timestamp1" in the first row of FIG. 5), a transaction ID (tid; for example, "tid1" in the first row of FIG. 5), a value (call name; for example, "com.lang.Java.Foo1#Meth1" in the first row of FIG. 5) and so forth are included. It is to be noted that, in the detailed log 121, logs whose tids are common are logs of a module (process) executed by one transaction, in other words, by one service.

The log process unit 112, function extraction unit 113 and service information production unit 114 perform path analysis regarding message data sampled from the servers as a result of inputting of data by a virtual user and store a result of the analysis, for example, as service information into the storage unit 120. It is to be noted that the service information produced by the analysis apparatus 100 include the path information 126 and component definition information 127.

Processes by the log process unit 112, function extraction unit 113 and service information production unit 114 are described below.

The log process unit 112 performs coupling of logs for each service (may also be referred to each transaction or each request) on the basis of the detailed log 121 to produce a coupling result 122 and stores the produced result 122 into the storage unit 120. For example, the log process unit 112 can refer to the detailed log 121 to perform coupling of logs (modules (processes)) whose transaction IDs are common for each request such that the coupling result 122 depicted in FIG. 6 is produced.

FIG. 6 is a view depicting an example of the coupling result 122 according to the present embodiment. The coupling result 122 is information produced by adding, for each request, identification information of services belonging to (included in) the request, for example, to the detailed log 121 depicted in FIG. 5. For example, as depicted in FIG. 6, the coupling result 122 can include a URL as an example of an identifier of a service, a transaction ID and a call name (for example, package, class, and/or method) of a module. It is to be noted that information of time in the detailed log 121 may be included in the coupling result 122.

The function extraction unit 113 extracts a component (module (process)) in a fine granularity regarding each service (URL, function) on the basis of the coupling result 122 and produces the cid correspondence table 123 and the cid set table 124 and then stores the produced tables into the storage unit 120. For example, the function extraction unit 113 can refer to the coupling result 122 to allocate a unique ID (cid; for example, represented as ck (k is a natural number)) to each of modules which do not overlap with each other and produce the cid correspondence table 123 that is a correspondence table between the cks and classes and the methods. Further, the function extraction unit 113 can refer to the coupling result 122 to produce the cid set table 124 in which cids of modules included in the service (transaction) are associated with the service.

FIG. 7 is a view depicting an example of the cid correspondence table 123 according to the present embodiment, and FIG. 8 is a view depicting an example of the cid set table 124 according to the present embodiment. The cid correspondence table 123 can include, for example, an ID (cid) and a value (call name). As an example, the cid correspondence table 123 includes an ID "c1" and a value "Jpn.user.Pkg1#Meth1" as depicted in FIG. 7. Further, the cid set table 124 can include, for example, a URL of a service, a tid corresponding to the service and one or more cids (cid set) corresponding to a module group included in the service. As an example, the cid set table 124 includes a URL "URL1", a tid "tid1" and a cid set "c1, c2, c4, c5, c6" as depicted in FIG. 8.

It is to be noted that it is preferable to remove, before production of the cid correspondence table 123 and the cid set table 124 by the function extraction unit 113, logs whose modules overlap with each other in the same transaction from the coupling result 122, for example, by the log process unit 112 or the function extraction unit 113. Consequently, the same module is not registered as a plurality of cids in the cid correspondence table 123 and the cid set table 124. Therefore, the processing load to the service information production unit 114 and the analysis apparatus 200 hereinafter described can be reduced.

Figure 18:
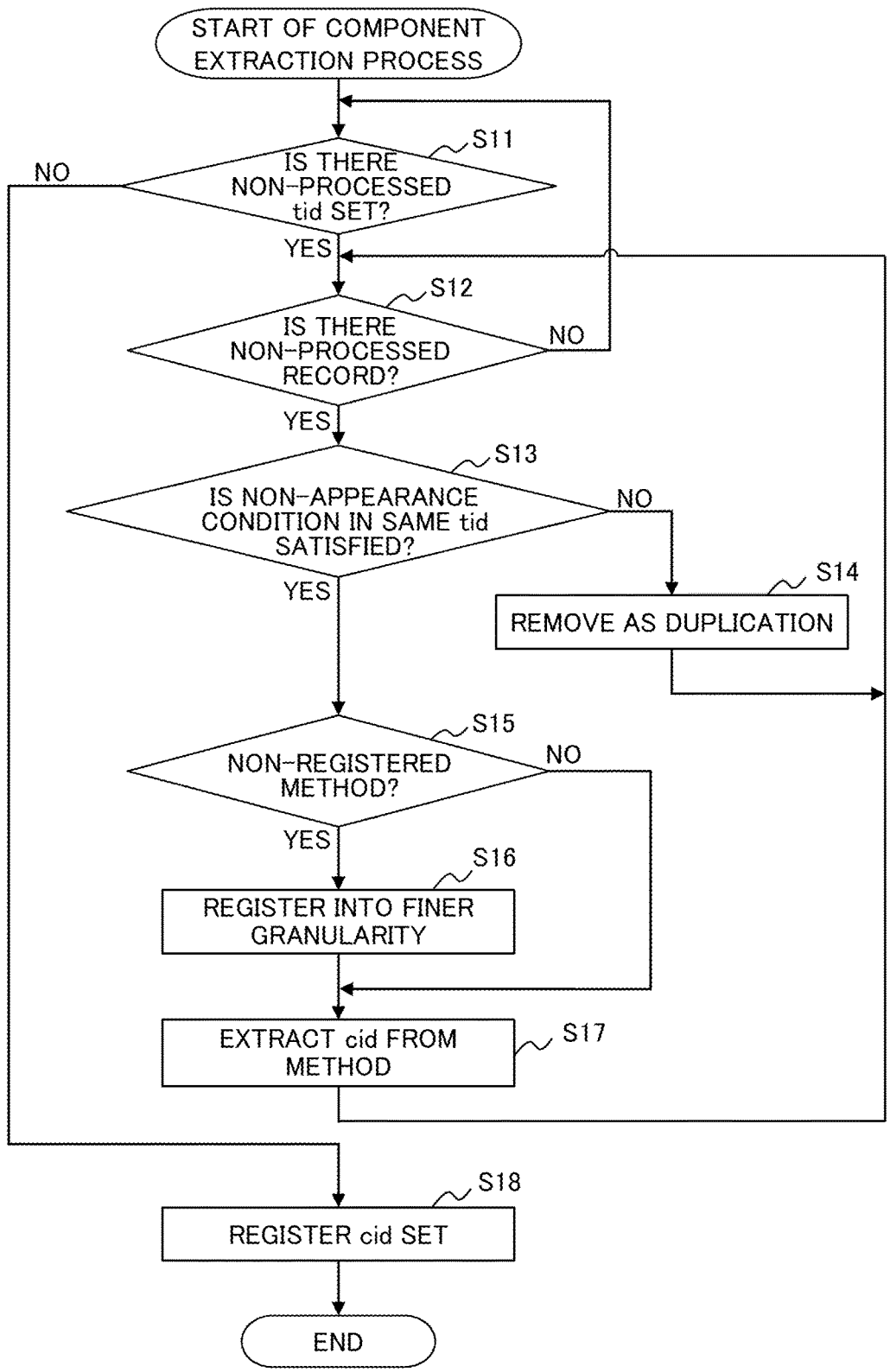
FIG. 18 is a flow chart illustrating a procedure of a component extraction process according to the present embodiment.

A detailed procedure of a process (production of the cid correspondence table 123 and cid set table 124) by the function extraction unit 113 is hereinafter described with reference to FIGS. 18 and 19.

The service information production unit 114 compares a common point (may also be referred to a common module or a common process) for each service based on the cid correspondence table 123 and cid set table 124 to define a component and produces service information (for example, path information 126 and component definition information 127). Then, the service information production unit 114 stores the produced service information into the storage unit 120. It is to be noted that, where the analysis apparatus 100 is implemented by an information processing apparatus different from the analysis apparatus 200, the service information production unit 114 may transmit a pid correspondence table 125 hereinafter described and the service information (path information 126 and component definition information 127) to the analysis apparatus 200.

Relating to a module having no common point in the highest hierarchy from among a plurality of modules (processes) in the cid correspondence table 123, the highest hierarchy is hereinafter referred to as top level. Further, relating to a module having a common point in the highest hierarchy from among a plurality of modules in the cid correspondence table 123, a hierarchy just before a hierarchy in which there is no common point is hereinafter referred to as top level. For example, since, in a module c1 depicted in FIG. 7, a value "jpn" in the highest hierarchy exists only in the c1 (there is no common point in the top level), the top level in the c1 is determined as the highest hierarchy. Further, modules c3, c4 and c5 depicted in FIG. 7 have common hierarchies down to "com.lang.Java.Foo1", the top level of the modules c3, c4 and c5 is a hierarchy just before the hierarchy that includes no common point any more.

The service information production unit 114 can particularly refer to the cid correspondence table 123 to extract, relating to the modules (for example, c1, c2, . . . ), a hierarchy common with a different module in a descending order from the highest hierarchy toward a lower hierarchy to detect the top level and perform classification. Then, the service information production unit 114 can produce the pid correspondence table 125 depicted in FIG. 9 and can store the produced table into the storage unit 120. Then, the service information production unit 114 can produce the path information 126 depicted in FIG. 10 on the basis of the cid set table 124 and the pid correspondence table 125, and can produce the component definition information 127 depicted in FIG. 11 on the basis of the cid correspondence table 123 and the pid correspondence table 125.

Figure 9:
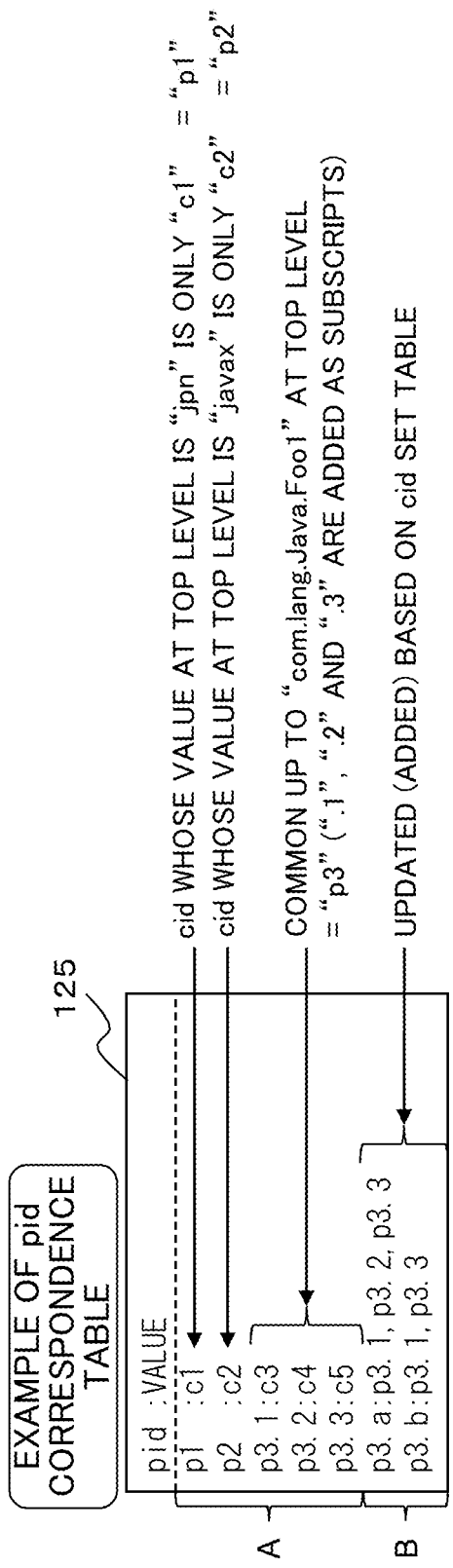
FIG. 9 is a view depicting an example of a pid correspondence table according to the present embodiment.

FIG. 9 is a view depicting an example of the pid correspondence table 125 according to the present embodiment. The pid correspondence table 125 can include, for example, an ID (pid) and a value (cid) (refer to a range A in FIG. 9). As an example, the pid correspondence table 125 includes an ID "p1" and a value "c1" as depicted in the first row of FIG. 9. Here, since a value "jpn" at the top level (highest hierarchy) exists only in the c1 (there is no common point in the top level) as described above, the component p1 is allocated solely.

As another example, the pid correspondence table 125 includes an ID "p3.1" and a value "c3" as indicated in the third to fifth rows in FIG. 9. Here, since, in the modules c3, c4 and c5, the value "com.lang.Java.Foo1" at the top level (hierarchy just before the hierarchy in which there is no common point any more) is common in the c3, c4 and c5 as described above, the component p3 is allocated collectively to the modules. At this time, subscripts ("0.1", "0.2" and "0.3") for distinguishing the c3, c4 and c5 are applied individually to the p3s, and the identification characters are stored as p3.1, p3.2 and p3.3 into the pid correspondence table 125.

Further, in the pid correspondence table 125, aggregates of individual components (in the example of FIG. 9, p3.1, p3.2 and p3.3) included in the services (URLs) are grouped and set as indicated in the sixth and seventh rows (refer to a range B in FIG. 9) of FIG. 9. At this time, aggregates that do not coincide fully among services are grouped individually.

As an example, as indicated in the sixth row of FIG. 9, an aggregate of individual components included in the cid set of the URL1 (refer to FIG. 7) is the components p3.1, p3.2 and p3.3 corresponding to the modules c3, c4 and c5. Further, as indicated in the seventh row of FIG. 9, an aggregate of individual components included in the cid set of the URL2 (refer to FIG. 7) is the components p3.1 and p3.3 corresponding to the modules c3 and c5. In this case, since the aggregates do not fully coincide with each other among the services (URLs), the aggregates are grouped individually. Then, in the pid correspondence table 125, the components p3.1, p3.2 and p3.3 of the URL1 are associated and stored with the component p3.a and the components p3.1 and p3.3 of the URL2 are associated and stored with the component p3.b.

Figure 10:
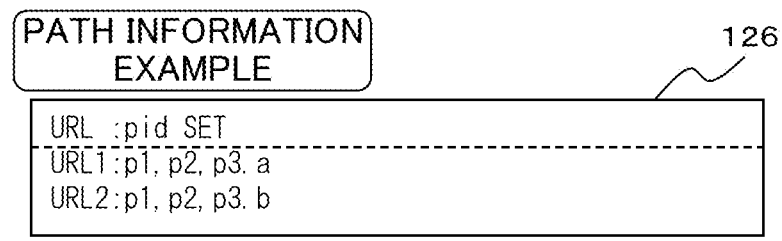
FIG. 10 is a view depicting an example of path information according to the present embodiment.

FIG. 10 is a view depicting an example of the path information 126 according to the present embodiment, and FIG. 11 is a view depicting an example of the component definition information 127 according to the present embodiment. The path information (may also be referred to first information) 126 is information which associates, for each service, the service with one or more of components (may also be referred to grouping processes) included in the service. For example, the path information 126 can include a URL of a service and one or more pids (pid set) corresponding to a module group included in the service. As an example, the path information 126 includes a URL "URL1" and a pid set "p1, p2, p3.a" as depicted in FIG. 10. It is to be noted that the path information 126 can be configured as information in which cids in a cid set of the cid set table 124 are replaced into pids on the basis of the pid correspondence table 125.

Further, the component definition information (may also be referred to second information) 127 indicates modules included in a component (grouping process) for each grouped hierarchy. For example, the component definition information 127 can include a pid and a value (e.g., module or component). As an example, the component definition information 127 includes a pid "p1" and a value "jpn.user.Pkg1#Meth1" as indicated in the first row of FIG. 11. As another example, the component definition information 127 includes a pid "p3.a" and a value "p3.1, p3.2, p3.3" as indicated in the third row of FIG. 11 and includes a pid "p3.1" and a value "com lang.Java.Foo1#Meth1" as indicated in the fifth row of FIG. 11. In this manner, the component definition information 127 is regarded as information for defining a hierarchical structure of a component defined by the service information production unit 114. It is to be noted that the component definition information 127 can be configured as information in which a cid set to the value in the pid correspondence table 125 is replaced into a call name ("com.lang.Java.Foo1#Meth1") on the basis of the cid correspondence table 123.

As described above, the cid correspondence table 123, cid set table 124, pid correspondence table 125, path information 126 and component definition information 127 have information capable of complementing each other. Accordingly, the function extraction unit 113 and the service information production unit 114 may omit production and storage of at least one of the information 123 to 127 into the storage unit 120 in the production process of the service information.

Here, according to the technique of the (technique 1) and (technique 2) described above, the components p1, p2 and p3 are produced so as not to include a module common thereamong.

On the other hand, the analysis apparatus 100 according to the present embodiment defines the components p3.a and p3.b including a common point (for example, common components p3.1 and p3.3). In other words, the analysis apparatus 100 stores, for distinction from each other, a first grouping process included in a first service, and a second grouping process that is included in a second service and in which one or more but less than all of a plurality of grouped processes is common to the first grouping process. In this manner, in the present embodiment, modules and the component p3.1, p3.2 and p3.3 in a lower hierarchy are converted hierarchically in a mode in which the components p3.a and p3.b can be distinguished from each other while they include a common point in the definitions of the components. Consequently, in the (technique 1) or the (technique 2), each module can be converted hierarchically in response to a level, a number of elements or the like, and, different from a case in which the components p31, p32, p33 and so forth are integrated as the component p3, appearance of an erroneous analysis result can be suppressed.

It is to be noted that, while the components p3.a and p3.b are distinguished from the components p1 and p2 by applying different subscripts thereto, the components p3.a and p3.b may be defined simply as the component p3. In this case, an attribute value indicating that a common point is included is applied to the component p3 and the attribute value may be managed by a table or the like.

Figure 20:
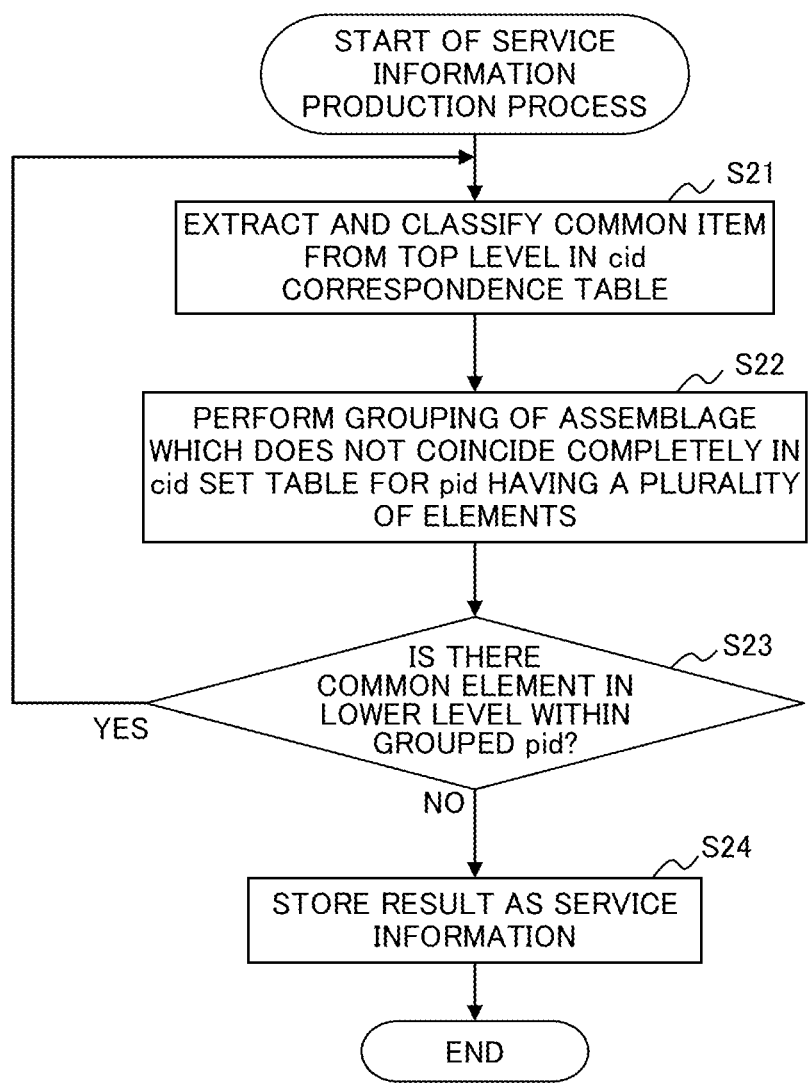
FIG. 20 is a flow chart illustrating a procedure of a service information production process according to the present embodiment.

A detailed procedure of a process (production of the pid correspondence table 125, path information 126 and component definition information 127) by the service information production unit 114 is hereinafter described with reference to FIGS. 20 and 21.

[1-3-2] Configuration of the Analysis Apparatus in the Operation Phase

Figure 12:
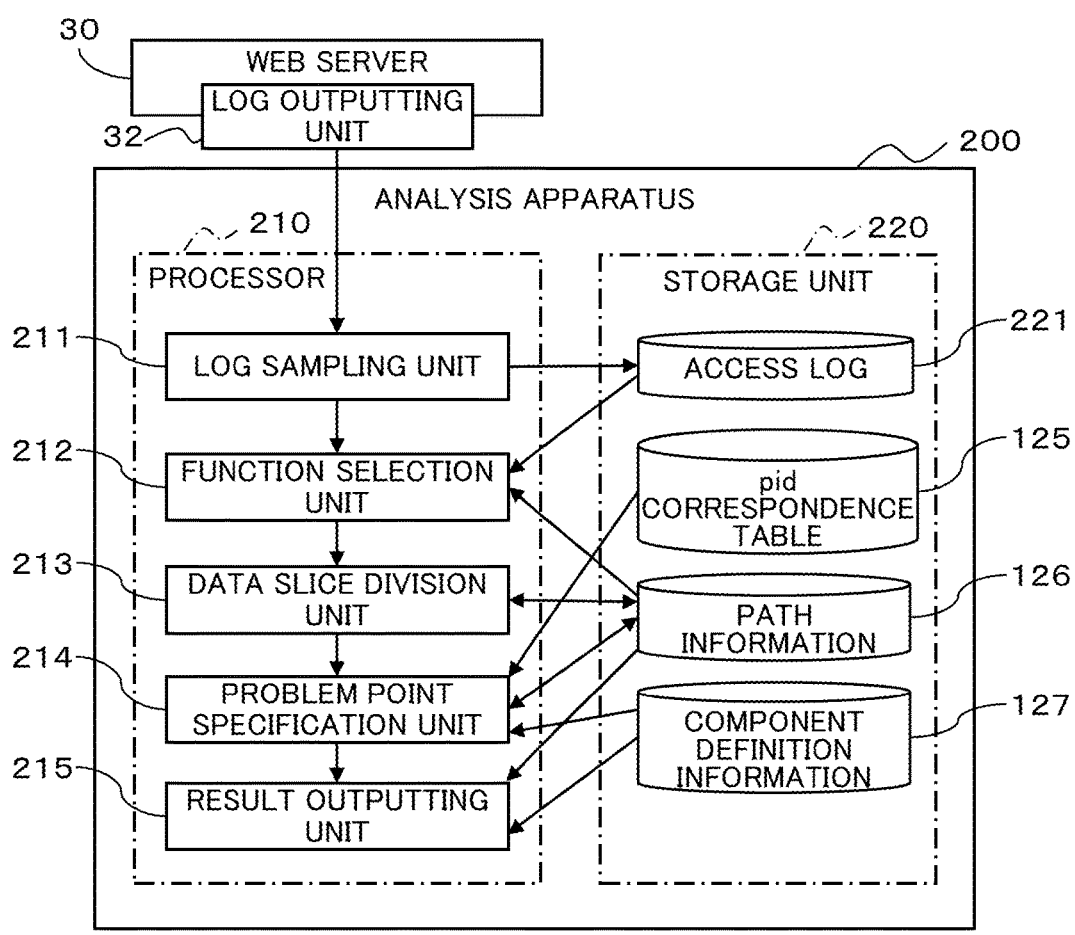
FIG. 12 is a block diagram depicting a hardware configuration and a functional configuration of an analysis apparatus in an operation phase of the present embodiment.

Now, a configuration of the analysis apparatus 200 in the operation phase 1B is described with reference to FIG. 12. FIG. 12 is a block diagram depicting a hardware configuration and a functional configuration of the analysis apparatus 200 in the operation phase 1B of the present embodiment. As described hereinabove, the analysis apparatus 200 can be provided in the AP server 40 or the like or in an information processing apparatus separate from the server group 20, 30 and 40. In the present embodiment, the analysis apparatus 200 is provided in the information processing apparatus separate from the server group 20, 30 and 40. It is to be noted that the analysis apparatus 200 may be implemented by an information processing apparatus same as the analysis apparatus 100.

While, in the analysis apparatus 200, a process to be executed by a processor 210 and information to be stored in a storage unit 220 are different from those of the analysis apparatus 100, the analysis apparatus 200 can include a configuration similar to that of the analysis apparatus 100. Unless otherwise specified, it is assumed that the analysis apparatus 200 has a configuration similar to that of the analysis apparatus 100.

Exemplarily, the processor 210 includes a log sampling unit 211, a function selection unit 212, a data slice division unit 213, a problem point specification unit 214 and a result outputting unit 215. The processor 210 can read out and execute a predetermined application program (analysis program) from the storage unit 220 so that functions as the components are implemented. Further, the storage unit 220 can store the analysis program described hereinabove and can store various kinds of information to be used for an abnormal point specification process by the processor 210. The storage unit 220 can store, as the various kinds of information, the pid correspondence table 125, path information 126 and component definition information 127 produced by the analysis apparatus 100, and can store, for example, an access log 221.

It is to be noted that, also in the analysis apparatus 200, the analysis program may be provided in the form in which it is recorded on a computer-readable recording medium. In this case, the processor 210 can read out the program from the recording medium through an interface such as a readout apparatus and can transfer and store the read out program to and into an internal storage apparatus or an external storage apparatus such that the program can be executed. Where the analysis apparatus 100 and 200 are implemented by information processing apparatus different from each other, the analysis program may be divided based on functions according to the pre-analysis phase 1A and the operation phase 1B such that the divided programs are provided to the analysis apparatus 100 and 200.

Then, functions as the log sampling unit 211, function selection unit 212, data slice division unit 213, problem point specification unit 214 and result outputting unit 215 implemented by the processor 210 are described with reference to FIGS. 12 to 16.

The log sampling unit 211 samples, for example, a URL+CGI parameter or the like, for example, as log data from data to be transmitted to the servers 20, 30 and 40 in an actual operation in the operation phase 1B. It is to be noted that, in the actual operation, only information of "server on the front" may be sampled. The "server on the front" signifies a server that receives a request from the user and is placed at the side nearest to the user in contrast with "all servers" in the pre-analysis phase 1A. In the configuration exemplified in FIG. 1, the Web server 30 is capable of corresponding to the server of "server on the front". In this case, the log sampling unit 211 samples log data from the log outputting unit 32 of the Web server 30. However, depending upon a configuration, the network switch 50 or a load dispersion server (load balancer; not depicted) sometimes corresponds to the "server on the front" or the AP server 40 sometimes corresponds to the "server on the front".

An example of log data to be sampled by the log sampling unit 211 is depicted in FIG. 13. FIG. 13 is a view depicting an example of the access log 221 according to the present embodiment. For example, the access log 221 can include a URL of a Web request to the Web server 30, time of the Web request (reception or response) to the Web server 30 and a period of time used for response to the Web request. As an example, the access log 221 includes a URL //foo.com/a.cgi~?" ("http"+"colon" in the URL is omitted) and time "timestamp1" and response time "3 ms" as depicted in FIG. 13.

The function selection unit 212 compares the sampled log data with the path information 126 acquired in advance from the analysis apparatus 100 to perform function selection (classification) of the log data.

The data slice division unit 213 performs a process for cutting out a time interval within which normal and abnormal data do not exist at the same time in selected functions (services) (process for calculating a variation timing of a state). It is to be noted that, where the selected function is not included in the path information 126, the selected function is applied to a service of the path information 126.

Figure 14:
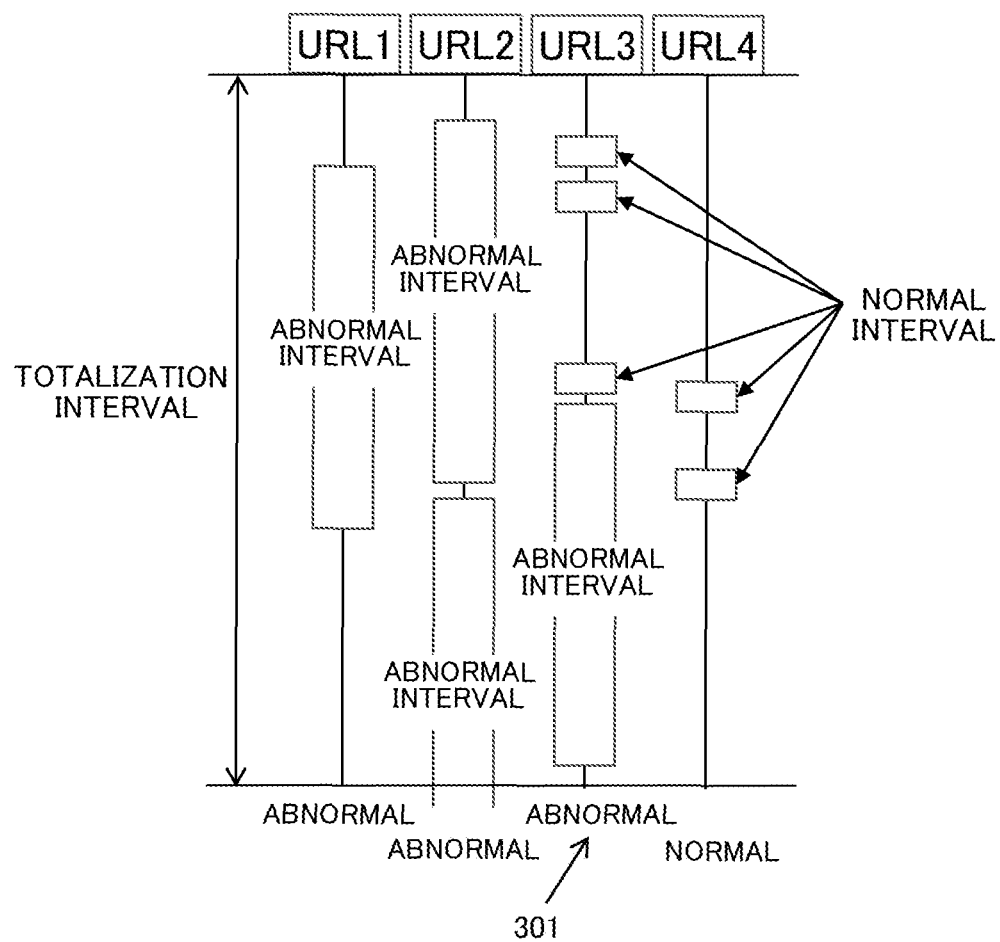
FIG. 14 is a view schematically depicting a manner in which both of normal data and abnormal data exist in a tabulation interval for each function according to the present embodiment.
Figure 15:
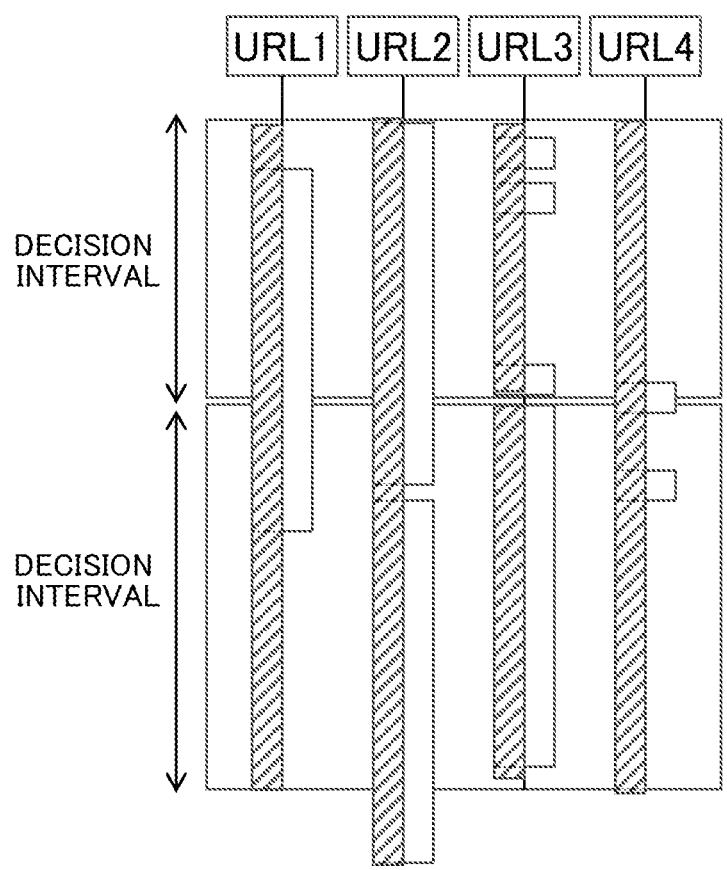
FIG. 15 is a view schematically illustrating a manner in which a normal interval and an abnormal interval are separated from each other and decided on the basis of overlapping therebetween in FIG. 14.

A problem where normal and abnormal data exist at the same time is described below with reference to FIGS. 14 and 15. FIG. 14 is a view schematically depicting a manner in which normal data and abnormal data exist at the same time in a tabulation interval for each function according to the present embodiment, and FIG. 15 is a view schematically illustrating a manner in which a normal interval and an abnormal interval are separated from each other and decision is performed based on overlapping between them in FIG. 14.

In FIG. 14, "abnormal interval" exemplifies a time interval of abnormal data and "normal interval" exemplifies a time interval of normal data. The "abnormal data" signifies, for example, data indicating that a response time range is greater than a normal range, and the "normal data" signifies, for example, data indicating that response time is within the normal range.

Here, there is a case in which, even with the same function, normal data and abnormal data exist at the same time depending upon a timing. In this case, it is difficult to perform filtering using a matrix described hereinabove with reference to FIGS. 3A to 3D on the basis of on the path information 126.

For example, where the threshold value for response time is 1 second (the data is abnormal if the response time is 1 second or more, but the data is normal if the response time is less than 1 second), even if just 1 second in an average is decided as abnormal (for example, refer to an arrow mark 301 of FIG. 14), this is not considered correct analysis. In this manner, where there is a problem depending upon a delicate timing, a result of decision as one of normal and abnormal states is obtained in an average and it is difficult to implement correct decision. Further, where all of response time values of a plurality of functions (URL1, URL2, . . . ) are in the proximity of the threshold value, the reliability of a result of the decision is very low.

Therefore, the data slice division unit 213 makes filtering possible by automatically cutting out a region (time interval) in which normal and abnormal states do not exist at the same time.

As an example of a basic process, the data slice division unit 213 calculates timings of variation between normal and abnormal states for each URL on the basis of the access log 221, and delimits a time interval within which normal and abnormal states do not exist at the same time for each URL on the basis of the timings.

Further, for example, as depicted in FIG. 15, the data slice division unit 213 may separate a normal interval and an abnormal interval from each other for each function (for example, for each URL) such that an overlapping region of the separated intervals is used for analysis. Consequently, the calculation amount can be reduced and data capable of being analyzed can be found, and the analysis accuracy is enhanced. Note that it is assumed that, in FIG. 15, similar normal or abnormal data exist before and after in time in the service URL1 and URL4. Further, in FIG. 15, a manner is exemplified in which an interval (decision interval) is divided into two by data of the service URL3.

If it is detected on the basis of a time interval that is delimited by the data slice division unit 213 and within which normal and abnormal states do not exist at the same time for each URL that the state of the service has varied (changed over) between the normal and abnormal states, then the problem point specification unit 214 executes the analysis process.

In particular, the problem point specification unit (may also be referred to a first decision unit) 214 produces a matrix and performs arithmetic operation as described above with reference to FIG. 3 within a range within which time intervals overlap with each other (calculates (detects) an abnormal module that is a problem point on the basis of the path information 126 of a plurality of services and modules) (this process may also be referred to a first decision process). Then, the problem point specification unit (may also be referred to a second decision unit) 214 compares the path information 126 and the component definition information 127 with each other to perform filtering or specification of a problem point (this process may also be referred to a second decision process).

For example, where components extracted as a cause point by the arithmetic operation of a matrix have a common component, the problem point specification unit 214 develops the common component into a finer granularity and performs the analysis process.

As an example, it is assumed that the problem point specification unit 214 performs decision described just below with regard to the service URL1 and URL2.

URL1: Delay
URL2: Normal

Note that it is assumed that the path information 126 of the URL1 and URL2 has the following information (refer to FIG. 10):

URL1=p1-p2-p3.a
 URL2=p1-p2-p3.b

In this case, the problem point specification unit 214 estimates that the component p3.an existing only in the URL1 that suffers from delay is a cause of the delay by the analysis using a matrix.

Then, the problem point specification unit 214 refers to the component definition information 127 to decide whether or not a different component in the same hierarchy having a common component exists in the component p3.a. Regarding component p3.a, there exists the component p3.b in the same hierarchy having the common components p3.1 and p3.3 which also exists in the component p3.a.

Therefore, the problem point specification unit 214 performs the analysis with the matrix using:

information of:
 p3.a: Delay; and
 p3.b: Normal
 and path information of a finer granularity of:
 p3.a=p3.1-p3.2-p3.3; and
 p3.b=p3.1-p3.3

Then, the problem point specification unit 214 estimates that the component p3.2 existing only in the p3.a in which delay occurs is a cause of the delay (abnormal process).

It is to be noted that the path information 126 used by the analysis apparatus 200 may be suitably updated. For example, the analysis apparatus 200 stores request data in the operation phase 1B as a user request into the storage unit 220 or the like. Then, if unknown data which has not appeared in the pre-analysis phase 1A appears in the operation phase 1B, then the analysis apparatus 200 may perform pre-analysis again using the stored request data to update the path information 126.

Figure 16:
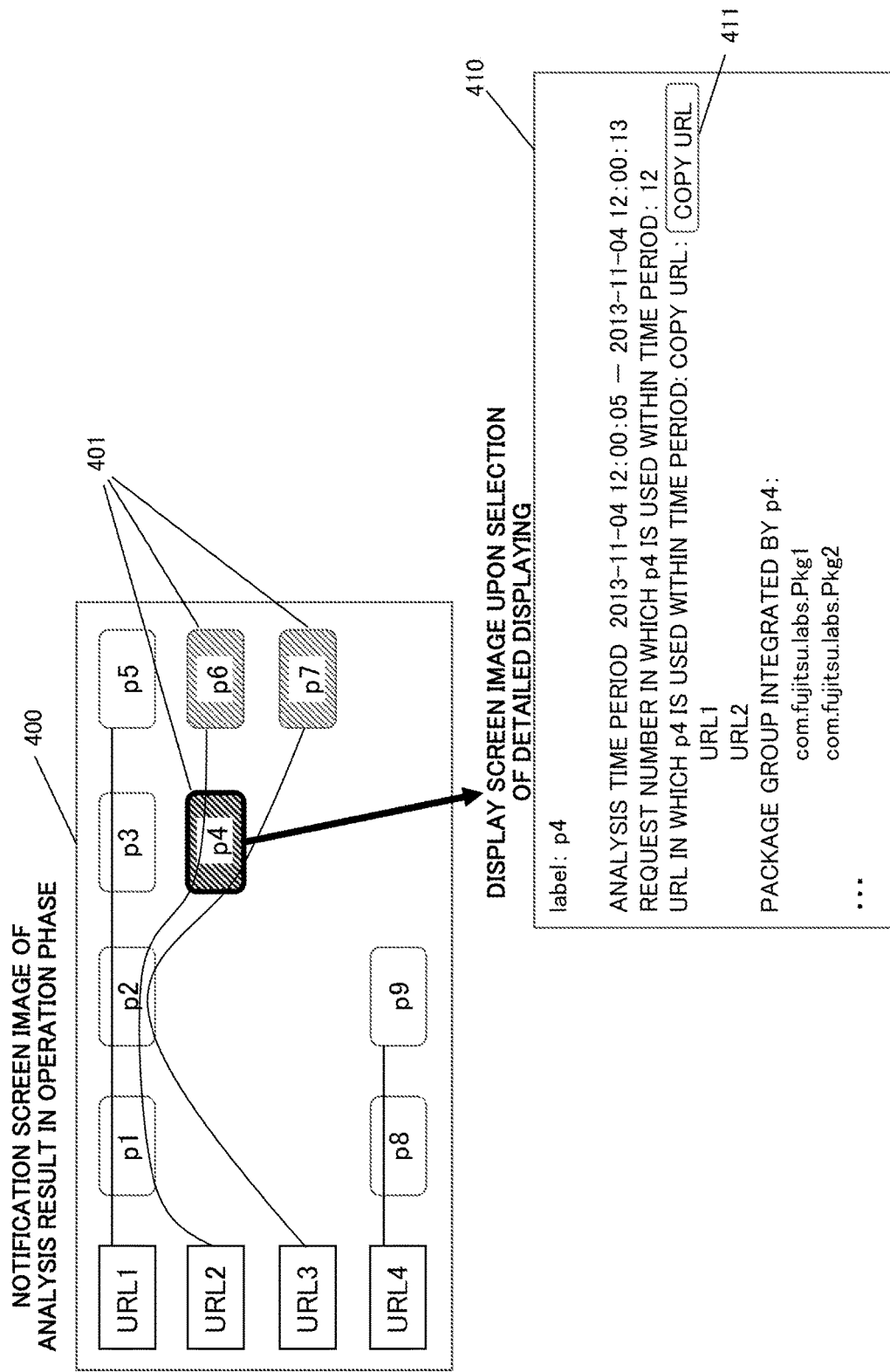
FIG. 16 is a view depicting an example of a notification screen image of a result of analysis in the operation phase according to the present embodiment.

The result outputting unit 215 outputs information of the problem point (abnormal process) estimated by the problempoint specification unit 214 to the display apparatus or the like. An example of the output data is depicted in FIG. 16. FIG. 16 is a view depicting an example of a notification screen image of an analysis result in the operation phase 1B according to the present embodiment. At the upper side in FIG. 16, an example of a notification screen image 400 of the analysis result in the operation phase 1B is depicted.

Exemplarily, on the notification screen image 400, a correspondence relationship (for example, path information) between a service (path) and a component is displayed. Further, a label (refer to reference numeral 401 of FIG. 16) of a component (or a module) of the estimated problem point from within the path information displayed on the notification screen image 400 is displayed in a mode different from that of the other labels (for example, the label is displayed in a different color). At this time, where a plurality of candidates are found each as a problem point, the result outputting unit 215 may output a plurality of pieces of information, for example, with priority ranks (for example, a candidate p4 whose possibility as a problem point is highest is displayed with a deeper color than those of the other candidates p6 and p7 or the like). However, there is a possibility that the priorities are not assigned.

Further, the label of the problem point is displayed so as to be capable of being selected (for example, the label can be clicked by a mouse or the like), and if the user selects the label, then a detailed display screen image 410 depicted at the lower side in FIG. 16 is displayed. It is to be noted that the result outputting unit 215 may automatically display a cause component in detail.

Exemplarily, in the detailed display screen image 410, information such as a label (component) name, an analysis period, a number of requests using a cause component within the analysis period, a URL using the cause component within the analysis period and a package group integrated on the basis of the cause component is displayed.

It is to be noted that the result outputting unit 215 may display a button (refer to reference numeral 411 of FIG. 16) for copying a URL that uses the component that is a delay cause on a clipboard or the like. Further, the result outputting unit 215 may automatically perform development into a fine granularity also on the notification screen image 400 similarly to automatic development into a fine granularity upon analysis by the problem point specification unit 214. For example, when it is estimated by the problem point specification unit 214 that the component p3.2 included in the component p3.a is a cause of delay (abnormal process), information indicating that "p3.2=com.lang.Java.Foo2#Meth1" is a delay cause is displayed on the detailed display screen image 410.

It is to be noted that the notification screen image 400 may be displayed before estimation of a problem point by the problem point specification unit 214 is completed (for example, before or after starting of analysis).

Further, the result outputting unit 215 may issue a notification by a mail or the like to the user, and/or may store the analysis result into a file, without displaying path information or a problem point on the display apparatus or the like.

As described above, the analysis apparatus 100 analyzes a use component in advance with the finest granularity in the pre-analysis phase 1A and produces a component definition with a plurality of granularities taking presence or absence of a common component into consideration with a component of a finer granularity. In other words, regarding a service including a plurality of processes having a plurality of hierarchies, the analysis apparatus 100 produces and stores service information in which processes of each service are grouped in a predetermined hierarchy taking presence or absence of a common hierarchy into consideration.

Further, when it is analyzed in the operation phase 1B that a component having a common component is a cause point, the analysis apparatus 200 makes the granularity of the component (until a grouped component disappears) finer and then performs analysis again. In this manner, the analysis apparatus 200 specifies a cause point stepwise. In other words, the analysis apparatus 200 performs the first decision process for deciding presence or absence of abnormality in a process included in one or more services on the basis of log data and service information relating to a plurality of services. Further, where a process decided as an abnormal process is the grouping process by which it has been grouped, the analysis apparatus 200 performs, on the basis of the service information, the second decision process for developing the grouping process decided as an abnormal process into one or more processes in a lower hierarchy than a predetermined hierarchy and deciding presence or absence of abnormality relating to the one or more developed processes.

In this manner, with the analysis apparatus 100 and 200, a cause point can be analyzed without making a mistake of decision of a cause point as in a case where analysis is performed with a low granularity and without spoiling the real time performance as in a case where analysis is performed with a rough granularity.

[1-4] Example of Operation of the Analysis Apparatus According to the Present Embodiment Now, an example of operation of the analysis apparatus 100 and 200 according to the present embodiment configured in such a manner as described above is described.

Figure 17:
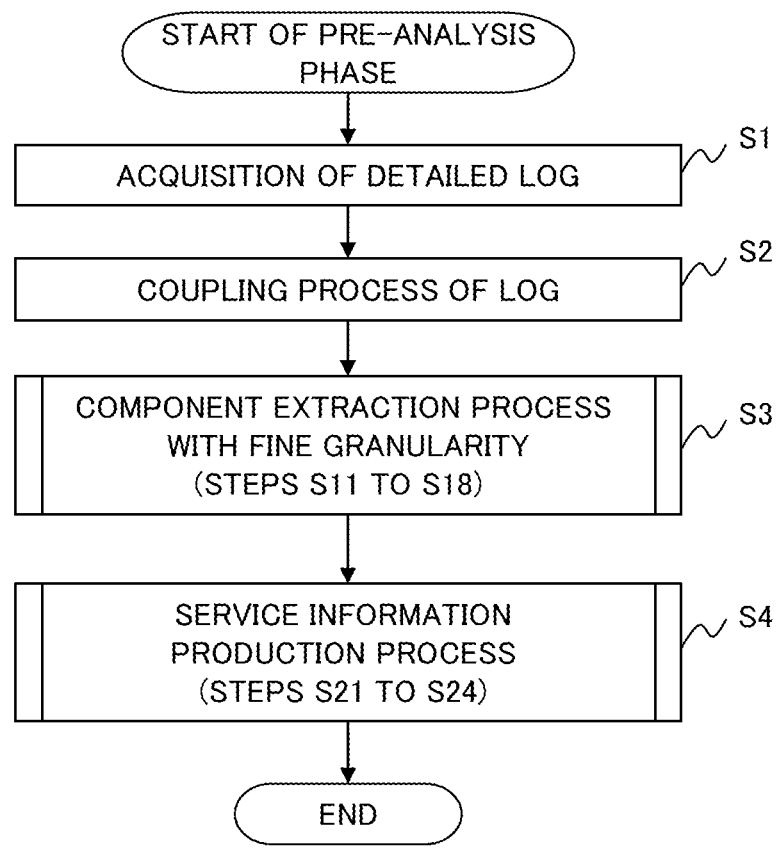
FIG. 17 is a flow chart illustrating an example of operation of the analysis apparatus in the pre-analysis phase according to the present embodiment.

[1-4-1] Example of Operation of the Analysis Apparatus of the Pre-Analysis Phase First, an example of operation of the analysis apparatus 100 according to the present embodiment is described in accordance with a flow chart (steps S1 to S4) depicted in FIG. 17.

In the pre-analysis phase 1A, the analysis apparatus 100 issues a request from the log sampling unit 111 to the servers 20, 30 and 40 through the network 10. In the servers 20, 30 and 40 receiving the request, a process corresponding to the request is executed and a request log corresponding to the request is outputted to the analysis apparatus 100. It is to be noted that the request is issued by reproducing request data prepared in advance, for example, in a user request database (not depicted). The issuing process of the request is repetitively performed until a predetermined ending condition is satisfied. It is to be noted that, as the request data, data sampled upon actual operation, data produced as test data or the like can be used.

Then, the log sampling unit 111 receives and samples detailed logs 121 as an example of a request log from the servers 20, 30 and 40 or the like (step S1). The detailed logs 121 sampled by the log sampling unit 111 are stored into the storage unit 120.

Thereafter, the log process unit 112 performs coupling of logs for each service (transaction, request) based on the detailed logs 121 to produce the coupling results 122 and then stores the produced data into the storage unit 120 (step S2).

Then, on the basis of the coupling results 122, the function extraction unit 113 extracts a component (module (process)) with a finer granularity relating to each service (URL, function) and produces a cid correspondence table 123 and a cid set table 124 and then stores the produced data into the storage unit 120 (step S3). The processing procedure at step S3, for example, a procedure of the process (may also be referred to a component extraction process) by the function extraction unit 113, is hereinafter described with reference to FIGS. 18 and 19.

The service information production unit 114 compares common points (common modules (common processes)) for each service to define a component based on the cid correspondence table 123 and the cid set table 124 produced at step S3. Then, the service information production unit 114 produces service information (path information 126 and component definition information 127) and stores the produced information into the storage unit 120 (step S4). The processing procedure at step S4, for example, the procedure of the process (may also be referred to a service information production process) by the service information production unit 114, is hereinafter described with reference to FIGS. 20 and 21.

[1-4-1-1] Component Extraction Process

Now, an example of operation of the component extraction process of the analysis apparatus 100 (function extraction unit 113) is described with reference to a flow chart (steps S11 to S18) depicted in FIG. 18 and an example of a table depicted in FIG. 19.

First, in the component extraction process, the function extraction unit 113 refers to the coupling results 122 (referring to FIG. 19) produced by the log process unit 112 to decide whether or not there remains a non-processed tid set (step S11). If there is a non-processed tid set (Yes route at step S11), then the function extraction unit 113 decides whether or not there remains a non-processed record in the coupling results 122 (step S12).

If there remains no non-processed record (No route at step S12), then the processing returns to step S11. On the other hand, if there remains a non-processed record (Yes route at step S12), the function extraction unit 113 decides whether or not a condition that a module of a non-processed record does not appear in the same tid as yet is satisfied (step S13). If the condition that a module of anon-processed record does not appear in the same tid as yet is not satisfied (No route at step S13), then the function extraction unit 113 removes the record as an overlapping record (step S14, refer to a duplication removing example 122 of FIG. 19). Thereafter, the processing advances to step S12. It is to be noted that the overlap removing of the coupling result 122 may be performed by the function extraction unit 113 but not performed when the coupling result 122 is produced by the log process unit 112.

On the other hand, if the condition that a module of a non-processed record does not appear in the same tid is satisfied at step S13 (Yes route at step S13), then the function extraction unit 113 decides whether or not the method in the module is a non-registered method in the cid correspondence table 123 (step S15). If the method is a non-registered method (Yes route at step S15), then the method is registered into the cid correspondence table 123 (refer to FIG. 19) (step S16). Then, the processing advances to step S17. It is to be noted that an element of the finest granularity in the cid correspondence table 123 (highest granularity table) is common to all of the URLs and tids. On the other hand, if the method is not a non-registered method (No route at step S15), then the processing advances to step S17.

At step S17, the function extraction unit 113 refers to the cid correspondence table 123 to extract a cid from the method in the module and stores the extracted cid, and then, the processing advances to step S12.

On the other hand, if there remains no non-processed tid set at step S1 (No route at step S11), then the function extraction unit 113 registers one or more cids (cid set) extracted and stored at step S17 into the cid set table 124 (refer to FIG. 19) (step S18). At this time, the function extraction unit 113 associates the cid set with a corresponding tid and URL.

The component extraction process by the function extraction unit 113 ends therewith.

[1-4-1-2] Service Information Production Process

Now, an example of operation of a service information production process of the analysis apparatus 100 (service information production unit 114) is described with reference to a flow chart (steps S21 to S24) depicted in FIG. 20 and an example of a table depicted in FIG. 21.

First, in the service information production process, the service information production unit 114 extracts and classifies common elements from the top level in the cid correspondence table 123 and produces a pid correspondence table 125 (refer to FIG. 21) and then stores the produced table into the storage unit 120 (step S21). For example, since, in the cid correspondence table 123 of FIG. 21, "jpn" at the top level of the c1 is included only in the c1 in the cid correspondence table 123, the component p1 is allocated singly to the c1 and the c1 is registered into the pid correspondence table 125 (refer to the first row in an A region of the pid correspondence table 125). Further, for example, in the cid correspondence table 123 of FIG. 21, "com.lang.Java.Foo1" at the top level of the c3 is common to the c3, c4 and c5 in the cid correspondence table 123. Therefore, the component p3 is allocated commonly to the c3, c4 and c5. At this time, subscripts "0.1", "0.2" and "0.3" are added to the p3s, respectively, in order to distinguish the c3, c4 and c5 from one another and the result of the addition is registered into the pid correspondence table 125 (refer to the third to fifth rows in the A region of FIG. 21).

Figure 21:
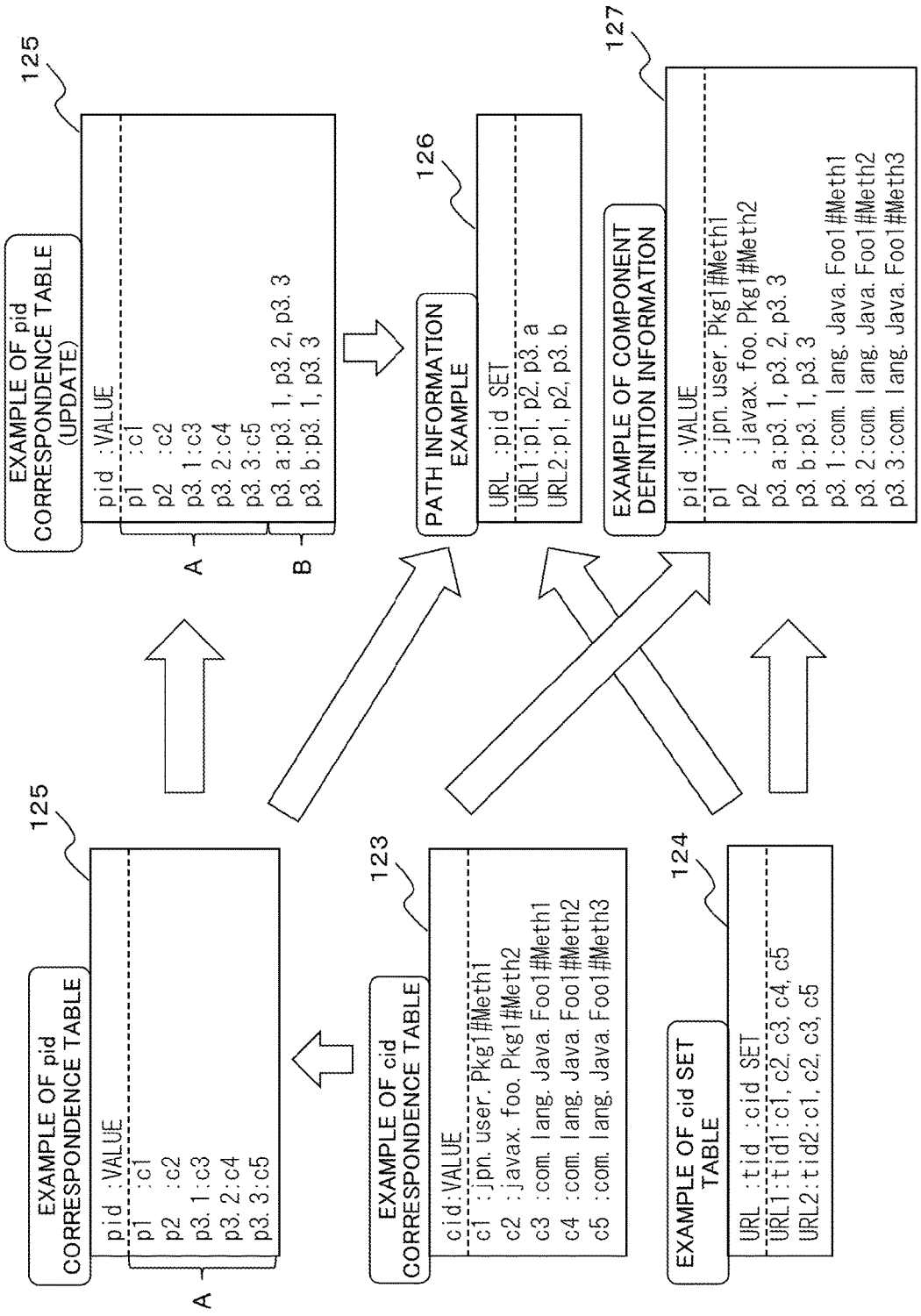
FIG. 21 is a view particularly illustrating the service information production process according to the present embodiment.

Then, the service information production unit 114 performs grouping of sets which do not fully coincide with each other in the cid set table 124 for a pid having a plurality of elements (step S22), and updates the pid correspondence table 125 (refer to a B region of the pid correspondence table (update) 125 of FIG. 21). For example, in the pid correspondence table 125 of FIG. 21, the component having a plurality of elements is only p3 and the cid set corresponding to the p3 is the c3, c4 and c5 in the URL1 and is the c3 and c5 in the URL2. In this case, since the c3, c4 and c5 and the c3 and c5 do not fully coincide with each other, the service information production unit 114 performs grouping of the services and updates the pid correspondence table 125 taking the grouped services as p3.a and p3.b.

Then, the service information production unit 114 decides whether or not there is a process common at a lower level in the grouped pids (step S23). If there is a common process in a lower level (Yes route at step S23), then the processing advances to step S21. For example, a case is considered in which, in the cid correspondence table 123 of FIG. 21, the c3 and c4 are such modules as described just below:

c3:com.lang.Java.Foo1.Boo2#Meth1
c4:com.lang.Java.Foo1.Boo2#Meth2

In the example of FIG. 21, while the c3, c4 and c5 are grouped based on "com.lang.Java.Foo1" in the URL1, also "Boot" in a hierarchy lower by one hierarchy is common to the c3 and c4. In this case, in order to extract the c3 and c4 on the basis of the "com.lang.Java.Foo1.Boo2", the service information production unit 114 extracts the process at step S21 again. It is to be noted that, in the example of the table depicted in FIG. 21, there is nothing corresponding to the Yes route at step S23.

On the other hand, if there is no process common in the lower level at step S23 (No route at step S23), then the service information production unit 114 stores the result as the service information (step S24), and the processing is ended. For example, the service information production unit 114 produces the path information 126 on the basis of the cid set table 124 and the pid correspondence table 125 and produces the component definition information 127 on the basis of the cid correspondence table 123 and the pid correspondence table 125 (refer to FIG. 21).

The service information production process by the service information production unit 114 ends therewith.

[1-4-2] Example of Operation of the Analysis Apparatus in the Operation Phase

Figure 22:
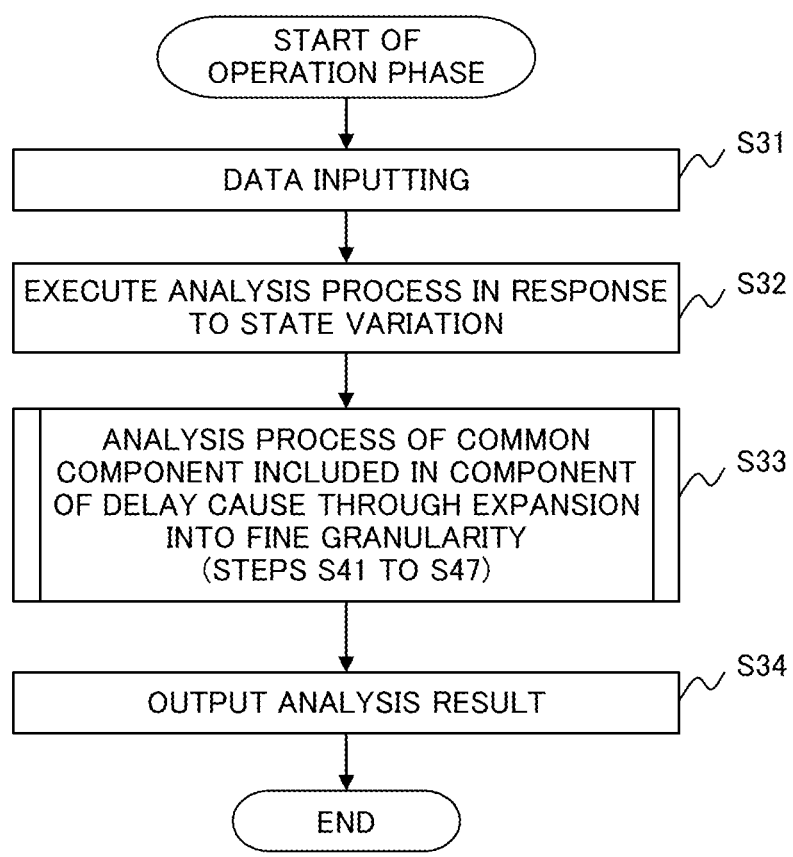
FIG. 22 is a flow chart illustrating an example of operation of the analysis apparatus in the operation phase according to the present embodiment.

Now, an example of operation of the analysis apparatus 200 according to the present embodiment is described with reference to a flow chart (steps S31 to S34) depicted in FIG. 22.

In the operation phase 1B, the analysis apparatus 200 receives log data from the Web server 30 as an example of a server on the front, and the log sampling unit 211 samples the log data (for example, the access log 221) (step S31).

Then, the function selection unit 212 selects a unit of function based on parameters such as a URL, a CGI and so forth from the sampled data.

Further, the data slice division unit 213 performs a process for cutting out a time interval within which a normal state and an abnormal state do not exist at the same time in the selected function (URL) (may also be referred to a process for calculating a variation timing of the state). It is to be noted that, where the selected function is not included in the path information 126, the selected function is allocated to the function of the path information 126.

Thereafter, if it is detected that the state of the service has varied between normal and abnormal states on the basis of the time interval that is delimited by the data slice division unit 213 and within which normal and abnormal states do not exist at the same time in each function, then the problem point specification unit 214 executes the analysis process (step S32).

Further, if a component estimated (extracted) as a cause point by the analysis process has a common component, then the problem point specification unit 214 develops the common component with a fine granularity and then performs the analysis process (step S33). In the analysis process at step S33, such development and analysis are repetitively performed hierarchically until the finest granularity is reached. The processing procedure at step S33, namely, the procedure of the process (may also be referred to the analysis process) by the problem point specification unit 214, is hereinafter described with reference to FIGS. 23 and 24.

Finally, the result outputting unit 215 outputs the information of the problem point (abnormal process) estimated by the problem point specification unit 214 to the display apparatus or the like (step S34).

The process of the analysis apparatus 200 in the operation phase 1B ends therewith.

[1-4-2-1] Analysis Process

Figure 23:
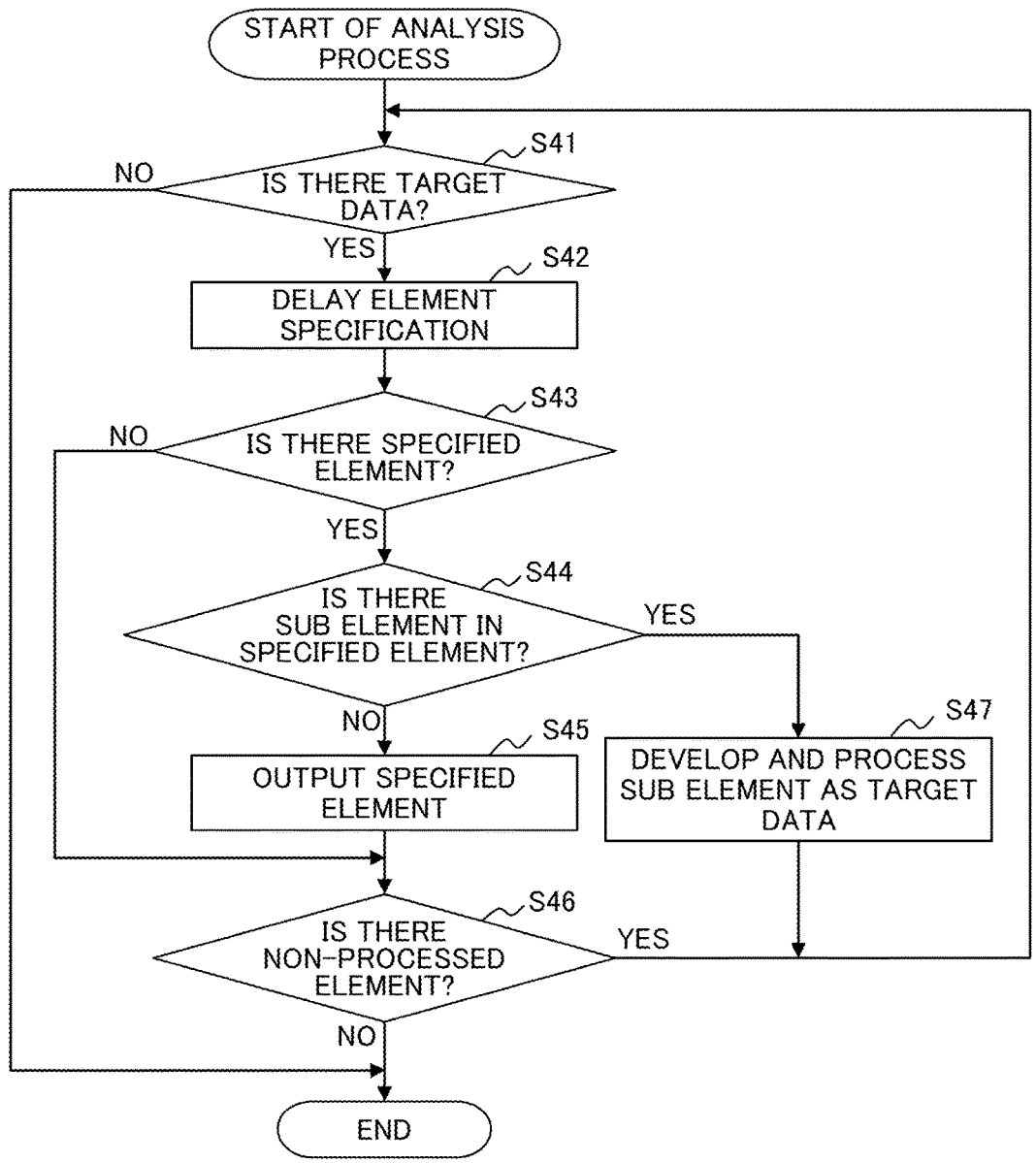
FIG. 23 is a flow chart illustrating a procedure of an analysis process according to the present embodiment.

Now, an example of operation of the analysis process of the analysis apparatus 200 (problem point specification unit 214) is described with reference to a flow chart (steps S41 to S47) depicted in FIG. 23 and an example of a table depicted in FIG. 24.

Figure 24:
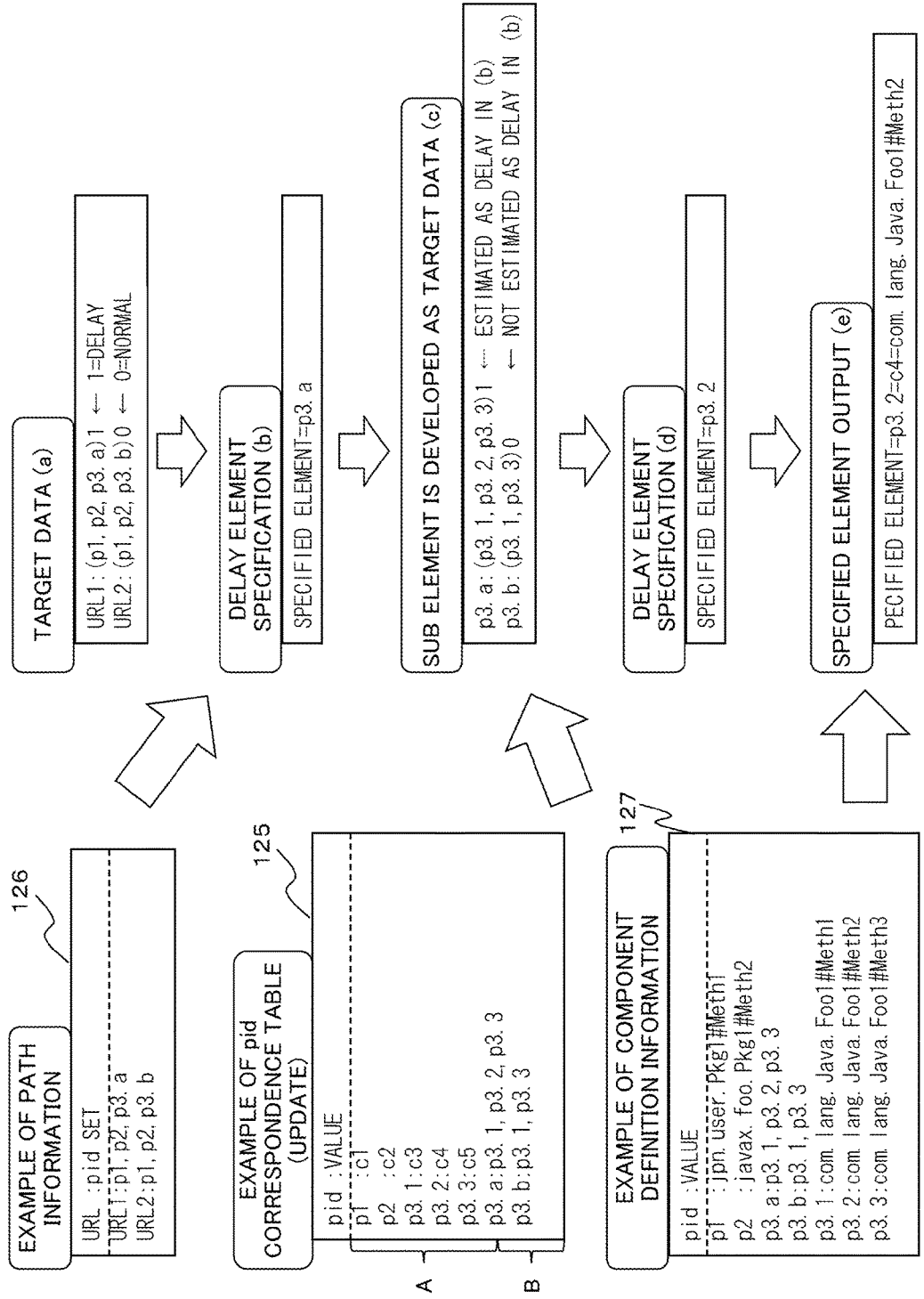
FIG. 24 is a view particularly illustrating the analysis process according to the present embodiment.

First, the problem point specification unit 214 decides whether or not there is target data (refer to (a) of FIG. 24) for the analysis process (step S41). If there is no target data (No route at step S41), then the processing is ended. On the other hand, if there is target data (Yes route at step S41), then the problem point specification unit 214 refers to the path information 126 to specify a delay element (delay component) from the target data (step S42, refer to (b) of FIG. 24).

For example, where the URL1 suffers from delay from within the target data and the URL2 is normal and the component p3.a that is not included in the URL2 is included in the URL1 as depicted in FIG. 24, the problem point specification unit 214 estimates the p3.a as an element of a delay cause.

Then, the problem point specification unit 214 decides whether or not there is an element specified at step S42, in other words, whether or not an element is specified at step S42 (step S43). If there is no specified element (No route at step S43), then the processing advances to step S46. On the other hand, if there is a specified element (Yes route at step S43), then the problem point specification unit 214 refers to the component definition information 127 to decide whether or not there is a sub element (may also be referred to a sub component) in the specified element (step S44).

If there is no sub element in the specified element (No route at step S44), then the problem point specification unit 214 outputs the specified element to the function selection unit 212 (step S45), and decides whether or not there is some other non-processed element (step S46). If there is a non-processed element (Yes route at step S46), then the processing advances to step S41. On the other hand, if there is no non-processed element (No route at step S46), the processing is ended.

On the other hand, if there is a sub element in the specified element (Yes route at step S44), then the problem point specification unit 214 refers to the component definition information 127 (or the pid correspondence table 125) to develop the specified element into the sub element (refer to (c) of FIG. 24). Then, the problem point specification unit 214 executes the process at step S41 again using the developed sub element as target data (step S47).

It is to be noted that, if the process at step S42 is executed regarding the sub element through the Yes route at step S41, then the problem point specification unit 214 specifies the element p3.2 as a delay element as depicted in (d) of FIG. 24. Since the element p3.2 does not have a sub element, the problem point specification unit 214 refers to the component definition information 127 to output such information relating to the specified element p3.2 as described just below to the result outputting unit 215 (refer to (e) of FIG. 24).

Specified element:
P3.2=c4=com.lang.Java.Foo1#Meth2

The analysis process by the problem point specification unit 214 ends therewith.

[2] Example of an Application

Now, an example of an application of the analysis apparatus 200 according to the present embodiment is described with reference to FIG. 25. The path information 126 depicted in FIG. 25 can be represented in the following manner.

URL1=p1-p2.a(p2.1)-p3.a(p3.1-p3.2-p3.3)
URL2=p1-p2.b(p2.1-p2.2)-p3.b(p3.1-p3.3)

Where the component p3.2 is a delay cause

Where the component p3.2 is a delay cause, since the component p3.2 is included only in the URL1, the problem point specification unit 214 performs the following decision regarding the service URL1 and URL2.

URL1: Delay
URL2: Normal

At this time, the problem point specification unit 214 estimates, by the analysis with a matrix on the basis of the path information 126, that the component p2.a or p3.a existing only in the URL1 in which delay occurs is a delay cause.

Then, the problem point specification unit 214 performs fine graining (development into sub components) for the components p2 and p3, respectively. While the problem point specification unit 214 performs analysis on the basis of the matrix, for example, for the p2, since there is no component existing only in the p2.a in which delay occurs, a cause point is not specified.

x p2.a=p2.1
o p2.b=p2.1-p2.2

On the other hand, the problem point specification unit 214 can perform analysis on the basis of the matrix for the p3 and extract (estimate) the component p3.2 existing only in the p3.a in which delay occurs as a cause point.

x p3.a=p3.1-p3.2-p3.3
o p3.b=p3.1-p3.3

Where the component p2.2 is a delay cause

Where the component p2.2 is a delay cause, since the component p2.2 is included only in the URL2, the problem point specification unit 214 performs the following decision regarding the service URL1 and URL2.

URL1: Normal
URL2: Delay

At this time, the problem point specification unit 214 estimates, by the analysis with a matrix on the basis of the path information 126, that the component p2.b or p3.b existing only in the URL2 in which delay occurs is a delay cause.

Then, the problem point specification unit 214 performs fine graining (development into sub components) for the components p2 and p3. The problem point specification unit 214 can perform the analysis on the basis of the matrix, for example, for the p2 and extract the component p2.2 existing only in the p2.b in which delay occurs as a delay cause.

o p2.a=p2.1
x p2.b=p2.1-p2.2

On the other hand, while the problem point specification unit 214 performs analysis on the basis of the matrix for the p3, since there is no component existing only in p3.b in which delay occurs, a delay point is not specified.

o p3 a=p31-p3.2-p3.3
x p3.b=p3.1-p3.3

Where the present application example is analyzed by the technique of the (technique 1) and the (technique 2), since the p2s and p3s in the URL1 and URL2 are integrated as the p2 and the p3, respectively, the URL1 and URL2 coincide with each other and nothing is detected as a delay cause.

Figure 25:
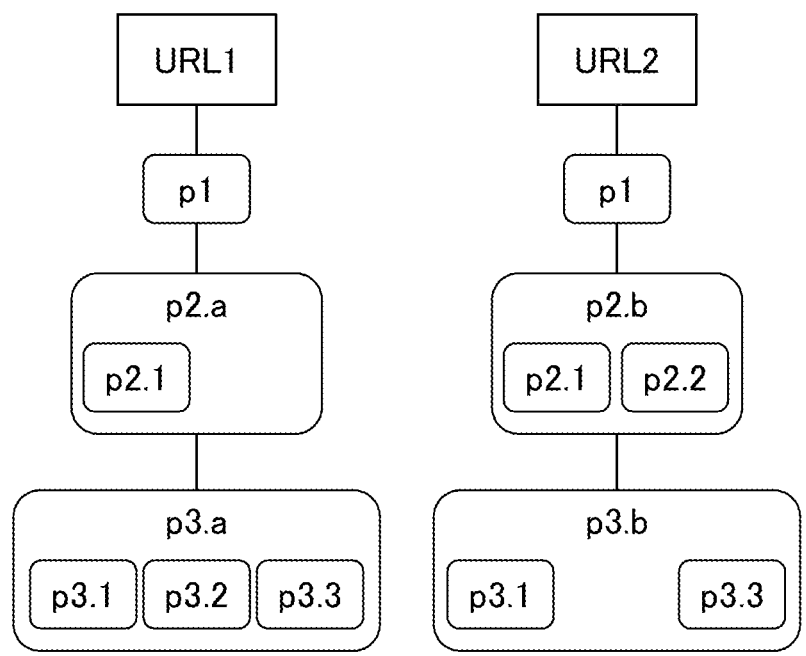
FIG. 25 is a view illustrating an example of application of the analysis process according to the present embodiment.

On the other hand, with the analysis apparatus 200 according to the present embodiment, an abnormal process can be estimated accurately even if a module is converted into a component with a predetermined granularity (may also be referred to a predetermined hierarchy) at a plurality of points as depicted in FIG. 25. Further, even if the granularity is decreased, in other words, even if a grouping of the process is performed in an upper hierarchy, decision of a delay point can be performed accurately. Further, since development of a component and hierarchical analysis are repetitively performed only for components having a possibility as a delay point, analysis and estimation of a delay point can be performed at a high speed without spoiling the real time performance in comparison with an alternative case in which analysis is performed with a fine granularity for the entire service.

[3] Modifications

The analysis apparatus 100 and 200 according to the present embodiment are not limited to those described above. Modifications to the analysis apparatus 100 and 200 according to the present embodiment are described below.

[3-1] First Modification

While the analysis apparatus 200 according to the present embodiment is described as an apparatus that starts analysis with the most rough (top level) granularity, the analysis apparatus 200 is not limited to this.

In particular, while the analysis apparatus 200 (problem point specification unit 214) according to the embodiment starts the analysis process in the ascending order of the granularity and then performs development with a finer granularity on the basis of a commonality of components or the like and further performs the process, the analysis may be started with a fine granularity.

For example, by setting a granularity level for starting of the analysis by the user, the analysis apparatus 200 (problem point specification unit 214) may start the analysis from a state in which the path information 126 is developed to the set granularity level.

Figure 26:
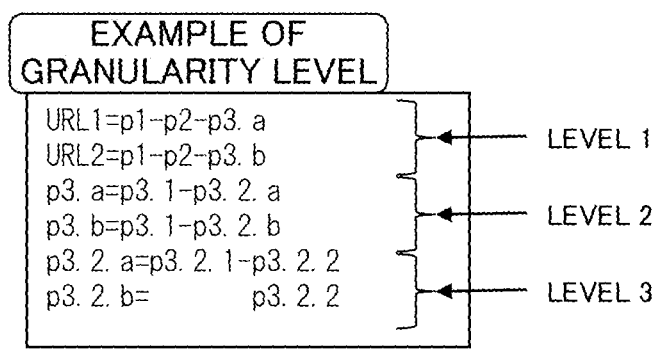
FIG. 26 is a view illustrating an example of setting of a granularity level according to a first modification.

FIG. 26 is a view illustrating an example of setting of a granularity level according to the first modification. The user would perform notification (setting), for example, of a granularity level such as a level 2 or a level 3 in advance to the analysis apparatus 200, and the analysis apparatus 200 stores the received granularity level into the storage unit 220 or the like. It is to be noted that the analysis apparatus 200 can recognize the set granularity level on the basis of the path information 126 and the component definition information 127 (or the pid correspondence table 125).

For example, it is assumed that the analysis apparatus 200 (problem point specification unit 214) according to the embodiment receives the path information 126 of the level 1 depicted in FIG. 26 and performs the following decision regarding the service URL1 and URL2.

URL1: Delay
URL2: Normal

In this case, the analysis apparatus 200 according to the present embodiment starts the analysis process from the level 1 and the components p1 and p2 are placed out of a cause candidate by filtering. Therefore, the components p3.a and p3.b of the level 2 are developed and then the analysis process is performed further.

On the other hand, if it is set (defined) that the process is started from the granularity of the level 2, then the analysis apparatus 200 (problem point specification unit 214) according to the first modification starts the analysis process from a state in which the path information 126 is developed with the level 2 in the following manner.

URL1=p1-p2-p3.1-p3.2.a
URL2=p1-p2-p3.1-p3.2.b

If the analysis apparatus 200 according to the first modification allocates a delay/normal decision of the example of inputting to the path information 126 developed in the level 2 as described above, then the components p1, p2 and p3.1 are placed out of a cause candidate by the filtering. Thus, the analysis apparatus 200 according to the first modification further develops the path information 126 developed with the level 2 with the level 3 (p3.2.a and p3.2.b) and then performs the analysis process.

In this manner, in the analysis process of the problem point specification unit 214, the analysis apparatus 200 decides presence or absence of an abnormal state after, regarding a grouped component from within a process included in one or more services, the component is developed in one or more processes in a lower hierarchy than the predetermined hierarchy on the basis of the component definition information 127.

Consequently, where the path information 126 in which the component definition is set to the most rough granularity is simple, in other words, where it is apparent that the analysis is performed after the development into a fine granularity, the analysis apparatus 200 according to the first modification can start the analysis in a state in which development to the set granularity level is performed in advance. Accordingly, with the analysis apparatus 200 according to the first modification, detection time for an abnormal process can be reduced.

[3-2] Second Modification

While the first modification is described as a mode in which a granularity is set by the user, the setting of a granularity is not limited to this. For example, the analysis apparatus 200 according to the second modification may include a function for learning a trend of data and determining an analysis starting granularity, in other words, for varying the predetermined hierarchy to a different hierarchy, in addition to the function of the analysis apparatus 200 according to the first modification.

For example, by repetitively performing detection of state variation of a path and analysis of a problem point by a predetermined number of times, the analysis apparatus 200 according to the second modification can learn a component whose possibility that it may become a delay cause is high. For example, the analysis apparatus 200 can manage the result of the learning by setting a cumulative number of times of estimation to a component estimated as a delay cause to the pid correspondence table 125, the component definition information 127 or the like.

Then, the analysis apparatus 200 according to the second modification performs the analysis process in a state in which a component whose possibility that it may become a delay cause is high (and a component in the proximity of the certain component or the like) is developed into a fine granularity in advance based on the learning result. It is to be noted that the analysis apparatus 200 may update the path information 126, the component definition information 127 and so forth on the basis of the learning result.

It is to be noted that one or a plurality of components developed in advance by the analysis apparatus 200 may be used. Information of "what number of components is to be developed by the analysis apparatus 200" or information of "to what level a component is to be developed by the analysis apparatus 200" can be determined by a technique such as setting by the user or automatic limitation by a calculation resource.

In this manner, with the analysis apparatus 200 according to the second modification, a component that actually becomes a delay cause can be learned and the first modification described above can be applied to a component whose possibility that it may become a delay cause is high or the like. Accordingly, since analysis can be started regarding a component whose possibility that it may become a delay cause is high in a state in which the component is developed in advance, detection time of an abnormal process can be reduced further.

[3-3] Third Modification

While the analysis apparatus 100 according to the embodiment is described as an apparatus that produces the component definition information 127 on the basis of the detailed log 121 sampled by the log sampling unit 111, the production of the component definition information 127 is limited to this.

For example, the analysis apparatus 200 may use a component definition information 127 (and the path information 126, and so forth) defined by the user and stored in the storage unit 220. In this case, the analysis apparatus 100 can omit production of the component definition information 127 and so forth. Further, the analysis apparatus 100 may produce some other information (for example, the pid correspondence table 125 and so forth) taking contents of the component definition information 127 defined by the user and so forth into consideration. It is to be noted that the analysis apparatus 200 may use the component definition information 127 produced by the analysis apparatus 100 and updated (processed) by the user and so forth.

For example, where a module frequently used, in other words, whose possibility that it may become a delay cause is high, is known at a stage of design of an application, a network, an entire system or the like, the user can define the component definition information 127 taking the module into consideration. For example, regarding a component including a module used frequently, the user can define the component with a comparatively fine granularity or the finest granularity. It is to be noted that, regarding a module whose use frequency is low, in other words, whose possibility that it may become a delay cause is low, the user may define a component with a rough granularity.

Consequently, since analysis can be started in a state in which a component whose possibility that it may become a delay cause is high is developed in advance, detection time of an abnormal process can be reduced.

[3-4] Fourth Modification

Further, the analysis apparatus 200 may learn a result of the analysis to dynamically change the component definition information 127 (and the path information 126 and so forth).

For example, there is a case in which, in a component of a certain level (hierarchy), the number of components (sub components) in a next (lower) level is great and the frequency is high in which it is decided that a component of the certain level is a delay cause. In such a case as just described, the analysis apparatus 200 can raise the efficiency of the analysis by dividing the component and defining the divided component as a plurality of components and then updating the component definition information 127.

[4] Others

While the preferred embodiment and modifications of the present technology are described in detail, the present technology is not limited to such specific embodiments described above, and variations and modifications can be made without departing from the scope of the present invention.

For example, while a case is described in the foregoing description of the embodiment in which a parameter in a URL or a module of an application is a target, the present technology is not limited to this. For example, the present technology can be applied similarly also to a parameter of a POST method, Hypertext Transfer Protocol (HTTP) header and so forth, and an effect similar to that described above is achieved thereby.

Further, the configuration of the pre-analysis phase 1A depicted in FIG. 1 including the analysis apparatus 100, may be removed (deleted) after production of the pid correspondence table 125, service information (e.g., path information 126, component definition information 127) and so forth and storage of the produced data into the analysis apparatus 200 are completed. In other words, since the pre-analysis phase 1A (analysis apparatus 100) has a configuration for producing the service information and so forth to be used in the operation phase 1B, at least the analysis apparatus 100 is unnecessary after production and storage of the service information and so forth.

Further, in the modifications described above, not only the component definition information 127 but also the path information 126, the pid correspondence table 125 and so forth may be produced by the user. In this case, the pre-analysis phase 1A (at least the analysis apparatus 100) may be omitted.

With the mode of the technology, it is possible to detect an abnormal process by a reduced decision process.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An analysis method, comprising:
   storing, relating to services each including a plurality of modules having a plurality of hierarchical process levels, service information in which modules for each service are grouped in a predetermined process level taking presence or absence of a common process level into consideration;
   performing, based on log data and the service information relating to a plurality of services, a first decision process for deciding presence or absence of an abnormality relating to a module included in one or more services; and
   performing a second decision process for developing, where a module decided as an abnormal module is a grouped grouping module, the grouping module decided as an abnormal module to one or more modules in a lower process level than the predetermined process level based on the service information and deciding presence or absence of an abnormality relating to the one or more developed modules.

2. The analysis method according to claim 1, wherein the service information includes, for each service, first information with which a grouping module included in the service is associated; and
   the analysis method further comprises storing a first grouping module included in a first service; and a second grouping module which is included in a second service and in which one or more but less than all of the plurality of grouped modules is common to that of the first grouping module, distinguishably from each other in the first information.

3. The analysis method according to claim 1, wherein the service information includes second information indicating a module included in the grouping module for each grouped process level; and
   the performing of the first decision process decides presence or absence of an abnormality relating to the grouping module from among the modules included in the one or more services after development to one or more modules in the lower process level than the predetermined process level is performed based on the second information.

4. The analysis method according to claim 1, wherein the service information includes second information indicating a module included in the grouping module for each grouped process level; and
   the analysis method further comprises:
      storing a processing result of the second decision process; and
      varying the predetermined process level into a different process level based on the stored processing result.

5. The analysis method according to claim 1, wherein the service information includes second information indicating a module included in the grouping module for each grouped process level; and
   the analysis method further comprises:
      storing a processing result of the second decision process; and
      dividing a predetermined grouping module into a plurality of grouping modules based on the stored processing result.

6. The analysis method according to claim 1, wherein, the performing of the second decision process develops, where the module decided as an abnormal module is a grouping module, the module decided as an abnormal module stepwise to one or more modules in a lower process level; and decides presence or absence of an abnormality relating to the one or more developed modules, the stepwise development being performed until a result of the decision that the module decided as an abnormal module is not a grouping module any more is obtained.

7. The analysis method according to claim 1, wherein a time period interval within which both of a normal state and an abnormal state are not included at the same time in each service state is acquired based on the log data relating to the plurality of services; and the performing of the first decision process decides, presence or absence of an abnormality relating to the module included in one or more services executed within the acquired time period interval.

8. An analysis apparatus, comprising:

a storage unit configured to store, relating to services including a plurality of modules having a plurality of hierarchical process levels, service information in which modules for each service are grouped in a predetermined process level taking presence or absence of a common process level into consideration; and a processor configured to:

perform, based on log data and the service information relating to a plurality of services, a first decision process for deciding presence or absence of an abnormality relating to a module included in one or more services; and develop, where a module decided as an abnormal module is a grouped grouping module, the grouping module decided as an abnormal module to one or more modules in a lower process level than the predetermined process level based on the service information and decide presence or absence of an abnormality relating to the one or more developed modules.

9. The analysis apparatus according to claim 8, wherein the service information includes, for each service, first information with which a grouping module included in the service is associated; and the storage unit stores the first information in which a first grouping module included in a first service; and a second grouping module which is included in a second service and in which one or more but less than all of the plurality of grouped modules is common to that of the first grouping module are set distinguishably from each other.

10. The analysis apparatus according to claim 8, wherein the service information includes second information indicating a module included in the grouping module for each grouped process level; and the processor decides presence or absence of an abnormality relating to the grouping module from among the module included in the one or more services after development to one or more modules in the lower process level than the predetermined process level is performed based on the second information.

11. The analysis apparatus according to claim 8, wherein the service information includes second information indicating a module included in the grouping module for each grouped process level;

the storage unit stores a processing result of the second decision process; and the processor varies the predetermined process level into a different process level based on the stored processing result.

12. The analysis apparatus according to claim 8, wherein the service information includes second information indicating a module included in the grouping module for each grouped process level;

the storage unit stores a processing result of the second decision process; and the processor divides a predetermined grouping module into a plurality of grouping modules based on the stored processing result.

13. The analysis apparatus according to claim 8, wherein, where the module decided as an abnormal module is a grouping module, the processor develops the module decided as an abnormal module stepwise to one or more modules in a lower process level and decides presence or absence of an abnormality relating to the one or more developed modules, the processing performing the development until a result of the decision that the module decided as an abnormal module is not a grouping module any more is obtained.

14. A non-transitory computer-readable recording medium having stored therein an analysis program for causing a computer to execute a process, the process comprising:

storing, relating to services each including a plurality of modules having a plurality of hierarchical process levels, service information in which modules for each service are grouped in a predetermined process level taking presence or absence of a common process level into consideration;

performing, based on log data and the service information relating to a plurality of services, a first decision process for deciding presence or absence of an abnormality relating to a module included in one or more services; and performing a second decision process for developing, where a module decided as an abnormal module is a grouped grouping module, the grouping module decided as an abnormal module to one or more modules in a lower process level than the predetermined process level based on the service information and deciding presence or absence of an abnormality relating to the one or more developed modules.

15. The non-transitory computer-readable recording medium having stored therein an analysis program according to claim 14, wherein the service information includes, for each service, first information with which a grouping module included in the service is associated; and the process further comprises:

storing a first grouping module included in a first service; and a second grouping module which is included in a second service and in which one or more but less than all of the plurality of grouped modules is common to that of the first grouping module, distinguishably from each other in the first information.

16. The non-transitory computer-readable recording medium having stored therein an analysis program according to claim 14, wherein the service information includes second information indicating a module included in the grouping module for each grouped process level; and the performing of the first decision process decides presence or absence of an abnormality relating to the grouping module from among the modules included in the one or more services after development to one or more modules in the lower process level than the predetermined process level is performed based on the second information.

17. The non-transitory computer-readable recording medium having stored therein an analysis program according to claim 14, wherein the service information includes second information indicating a module included in the grouping module for each grouped process level;

the process further comprises:

storing a processing result of the second decision process; and varying the predetermined process level into a different process level based on the stored processing result.

18. The non-transitory computer-readable recording medium having stored therein an analysis program according to claim 14, wherein the service information includes second information indicating a module included in the grouping module for each grouped process level;

the process further comprises:

storing a processing result of the second decision process; and dividing a predetermined grouping module into a plurality of grouping modules based on the stored processing result.

19. The non-transitory computer-readable recording medium having stored therein an analysis program according to claim 14, wherein, the performing of the second decision process develops, where the module decided as an abnormal module is a grouping module, the module decided as an abnormal module stepwise to one or more modules in a lower process level and decides presence or absence of an abnormality relating to the one or more developed modules, the stepwise development being performed until a result of the decision that the module decided as an abnormal module is not a grouping module any more is obtained.

20. The non-transitory computer-readable recording medium having stored therein an analysis program according to claim 14, wherein the process further comprises acquiring a time period interval within which both of a normal state and an abnormal state are not included at the same time in each service state based on the log data relating to the plurality of services; and the performing of the first decision process decides presence or absence of an abnormality relating to the module included in one or more services executed within the acquired time period interval.

\* \* \* \* \*